US00RE35898E

United States Patent [19]

Shibata et al.

[11] E Patent Number: Re. 35,898

[45] Reissued Date of Patent: Sep. 15, 1998

[54] LENS PERIPHERY PROCESSING APPARATUS, METHOD FOR OBTAINING PROCESSING DATA, AND LENS PERIPHERY PROCESSING METHOD

[75] Inventors: Ryoji Shibata, Toyokawa; Masahiko Kobayashi, Aichi-ken; Yukinobu Ban, Nishio; Hirokatu Obayashi, Aichi-ken, all of Japan

[73] Assignee: Nidek Co., Ltd., Gamagori, Japan

[21] Appl. No.: 700,021

[22] Filed: Aug. 20, 1996

Related U.S. Patent Documents

Reissue of:

[64] Patent No.: 5,347,762
Issued: Sep. 20, 1994
Appl. No.: 11,759
Filed: Feb. 1, 1993

[30] Foreign Application Priority Data

Feb. 4, 1992 [JP] Japan ..... 4-054214

[51] Int. Cl.[6] ..... B24B 49/00; B24B 51/00

[52] U.S. Cl. ..... 451/5; 451/41

[58] Field of Search ..... 451/15, 256, 240, 451/255, 1, 41, 44

[56] References Cited

U.S. PATENT DOCUMENTS 4,656,590 4/1987 Ace ..... 51/101 LG
4,944,585 7/1990 Mizuno ..... 351/204
4,945,684 8/1990 Wada et al. ..... 51/165.71
5,053,971 10/1991 Wood et al. ..... 51/165.71
5,144,561 9/1992 Soper ..... 51/165.71
5,148,637 9/1992 Byron ..... 51/165.71

FOREIGN PATENT DOCUMENTS

0426551A2 5/1991 European Pat. Off. .

*Primary Examiner*—Timothy V. Eley
*Assistant Examiner*—Derris H. Banks
*Attorney, Agent, or Firm*—Nikaido Marmelstein Murray & Oram LLP

[57] ABSTRACT

An apparatus and a method for processing lens peripheries which allow lenses to be properly fitted in a frame, i.e., which processes lenses with high dimensional accuracy. For this purpose, the lens periphery processing apparatus and method are designed to comprise an input device for inputting the configuration of lens frame portions of the eyeglasses frame which is a result of three-dimensional measurement, a calculation device for deriving peripheral lengths of the lens frame portions from the three-dimensional lens frame portion configuration inputted by the input device, a tapered edge curve determining device for determining a curve [value] defined by the locus of the tapered edge of each lens, and a computing device for computing the locus of the tapered edge of each lens which substantially coincides with the peripheral length of the associated lens frame portion which is obtained by the calculation device.

6 Claims, 22 Drawing Sheets

LENS PERIPHERY PROCESSING APPARATUS, METHOD FOR OBTAINING PROCESSING DATA, AND LENS PERIPHERY PROCESSING METHOD

Matter enclosed in heavy brackets [ ] appears in the original patent but forms no part of this reissue specification; matter printed in italics indicates the additions made by reissue.

BACKGROUND OF THE INVENTION

1. Industrial Field of the Invention

The present invention relates to an apparatus and a method for processing lenses to be fitted in an eyeglasses frame and, more particularly, to a processing apparatus and a processing method for processing lens peripheries on the basis of information from an eyeglasses frame configuration measuring device which measures the three-dimensional configuration of lens frame portions of the eyeglasses frame. (The configuration of the lens frame portions in this specification is a locus configuration of the groove bottom of the eyeglasses frame or of the position which approximates to it, and this configuration is also referred to as an eyeglass contour.)

2. Description of the Related Art

Each of the front and rear surfaces of an eyeglasses lens has a curve for obtaining a refractive force, respectively, which corrects abnormal refraction of the user of the eyeglasses. Also, a tapered edge *i.e., commonly known in the art as bevel,* formed on the periphery of the lens must be designed to have a spherical curve or a curve similar to it. Generally, the eyeglasses frame in which the lenses will be fitted is processed in such a manner that the lens frame portions have a predetermined curve R to facilitate the lens fitting operation.

The ideal condition when fitting the lenses in the eyeglasses frame after the tapered edge machining is that the tapered edge curve and the curve R of the lens frame portions of the eyeglasses frame coincide with each other. In many cases, however, these curves do not coincide. In the tapered edge machining of the lenses, the selection range of the tapered edge curve is narrow. Often, the tapered edge curve does not coincide with the spherical surface R of the lens frame portions.

A conventional apparatus which has a mechanism for measuring the configuration of lens frame portions of an eyeglasses frame performs the tapered edge machining when it obtains plane information of the lens frame portions, i.e., information of projected configuration of the lens frame portions, as viewed from the front, from a device for measuring the configuration of the lens frame portions.

Recently, an apparatus for measuring a three-dimensional configuration of lens frame portions has been put into practical use. However, the three-dimensional information is only used for removing cosine errors owing to an inclination of an eyeglasses frame, and for selecting with priority a tapered edge curve which coincides with the spherical surface R of the lens frame portions.

With the above-described conventional apparatus, when the tapered edge curve coincides with the curve R of the lens frame portions, these two curves have the same peripheral length. However, in many cases, the curves do not coincide, and consequently, they are different in the peripheral length. Therefore, if the lenses having the tapered edges thus machined are fitted in the eyeglasses frame, the peripheral lengths do not coincide with each other, so that the lens fitting will not be properly carried out. Then, there is caused a problem that the eyeglasses frame must be forcibly deformed by the operator.

SUMMARY OF THE INVENTION

The present invention has been made in view of the problem mentioned above. It is an object of this invention to provide an apparatus and a method for processing lens peripheries which allow lenses to be smoothly fitted in a frame, i.e., which processes lenses with high dimensional accuracy.

In order to achieve this object, the present invention has the following characteristics:

(1) A lens periphery processing apparatus for processing peripheries of lenses so as to fit the lenses in an eyeglasses frame is characterized in that it comprises input means for inputting the configuration of lens frame portions of the eyeglasses frame which is a result of three-dimensional measurement, calculation means for deriving peripheral lengths of the lens frame portions from the three-dimensional lens frame portion configuration inputted by the input means, tapered edge curve determining means for determining a curve [value] defined by the locus of the tapered edge of each lens, and computing means for computing the locus of the tapered edge of each lens which substantially coincides with the peripheral length of the associated lens frame portion which is obtained by the calculation means.

(2) A method for obtaining processing data of a lens periphery processing apparatus for fitting lenses in an eyeglasses frame is characterized in that it comprises a first step of three-dimensional measurement of the configuration of lens frame portions of the eyeglasses frame, a second step of deriving peripheral lengths of the lens frame portions of the eyeglasses frame on the basis of the data obtained in the first step, a third step of measuring or calculating the virtual or actual lens edge thickness and lens curve of each lens to be fitted in the frame, a fourth step of determining the curve [value] defined by the locus of the tapered edge on the basis of the data measured or calculated in the third step, and a fifth step of calculating control data of the lens periphery processing apparatus such that the peripheral length of the locus of the tapered edge determined in the fourth step substantially coincides with the peripheral length of the associated lens frame portion of the eyeglasses frame.

(3) A lens periphery processing method for processing peripheries of lenses so as to fit the lenses in an eyeglasses frame is characterized in that it comprises a first step of three-dimensional measurement of the configuration of lens frame portions of the eyeglasses frame, a second step of deriving peripheral lengths of the lens frame portions of the eyeglasses frame on the basis of the data obtained in the first step, a third step of measuring or calculating the virtual or actual lens edge thickness and lens curve of each lens to be fitted in the frame, a fourth step of determining the curve [value] defined by the locus of the tapered edge on the basis of the data measured or calculated in the third step, a fifth step of calculating control data of a lens periphery processing apparatus such that the peripheral length of the locus of the tapered edge determined in the fourth step substantially coincides with the peripheral length of the associated lens frame portion of the eyeglasses frame, and a sixth step of controlling the lens periphery processing apparatus on the basis of the control data obtained in the fifth step.

DETAILED DESCRIPTION OF THE PREFERRED EMBODIMENTS

One embodiment of the present invention will now be described in detail with reference to the accompanying drawings.

(1) General Construction of an Eyeglasses Grinding Apparatus

Figure 1:
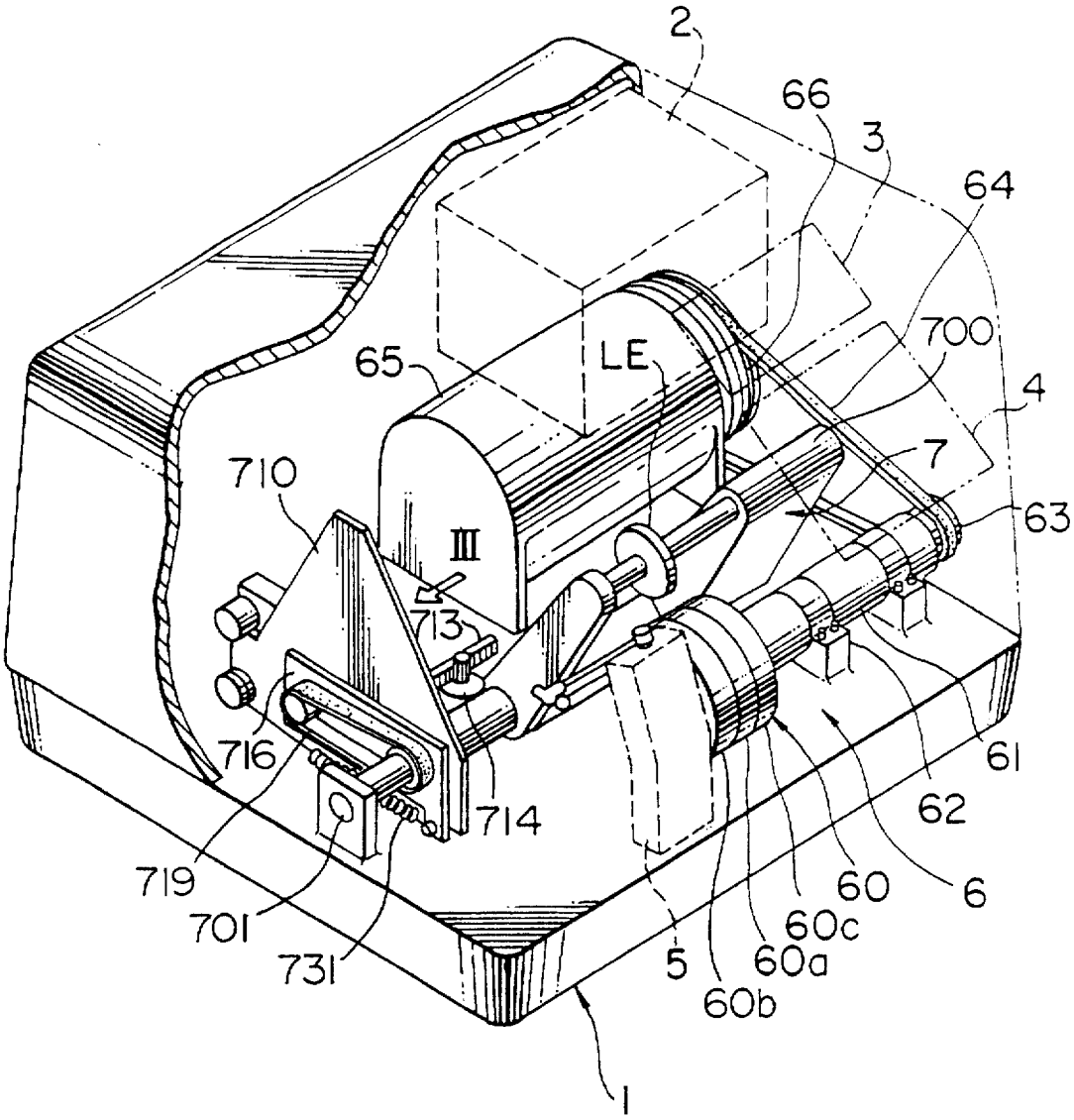
FIG. 1 is a perspective view showing the general construction of a lens grinding apparatus according to the present invention.

FIG. 1 is a perspective view showing the general construction of an eyeglasses grinding apparatus in accordance with the present invention. The reference numeral 1 indicates a machine base, on which the components of the lens grinding apparatus are arranged.

The reference numeral 2 indicates a lens frame portion and template configuration measuring device, which is arranged in the upper section of the grinding apparatus.

Arranged in front of the measuring device 2 are a display section 3, through which measurement results, calculation results, etc. are displayed in the form of characters or graphics, and an input section 4, at which data is entered or commands are given to the device.

Provided in the front section of the grinding apparatus is a lens configuration measuring device 5 for measuring the imaginary edge thickness, etc. of an unprocessed lens.

The reference numeral 6 indicates a lens grinding section, where an abrasive wheel means 60, which is composed of a rough abrasive wheel 60a for glass lenses, a rough abrasive wheel 60b for plastic lenses and an abrasive wheel 60c for tapered edge and plane machining, is rotatably mounted on a rotating shaft 61, which is attached to the base 1 by means of fixing bands 62.

Attached to one end of the rotating shaft 61 is a pulley 63, which is linked through a belt 64 with a pulley 66 attached to the rotating shaft of an AC motor 65. Accordingly, rotation of the motor 65 causes the abrasive wheel means 60 to rotate.

The reference numeral 7 indicates a carriage section, and the reference numeral 700 indicates a carriage.

(2) Constructions and Operations of the Component Parts (A) Carriage Section

Figure 2:
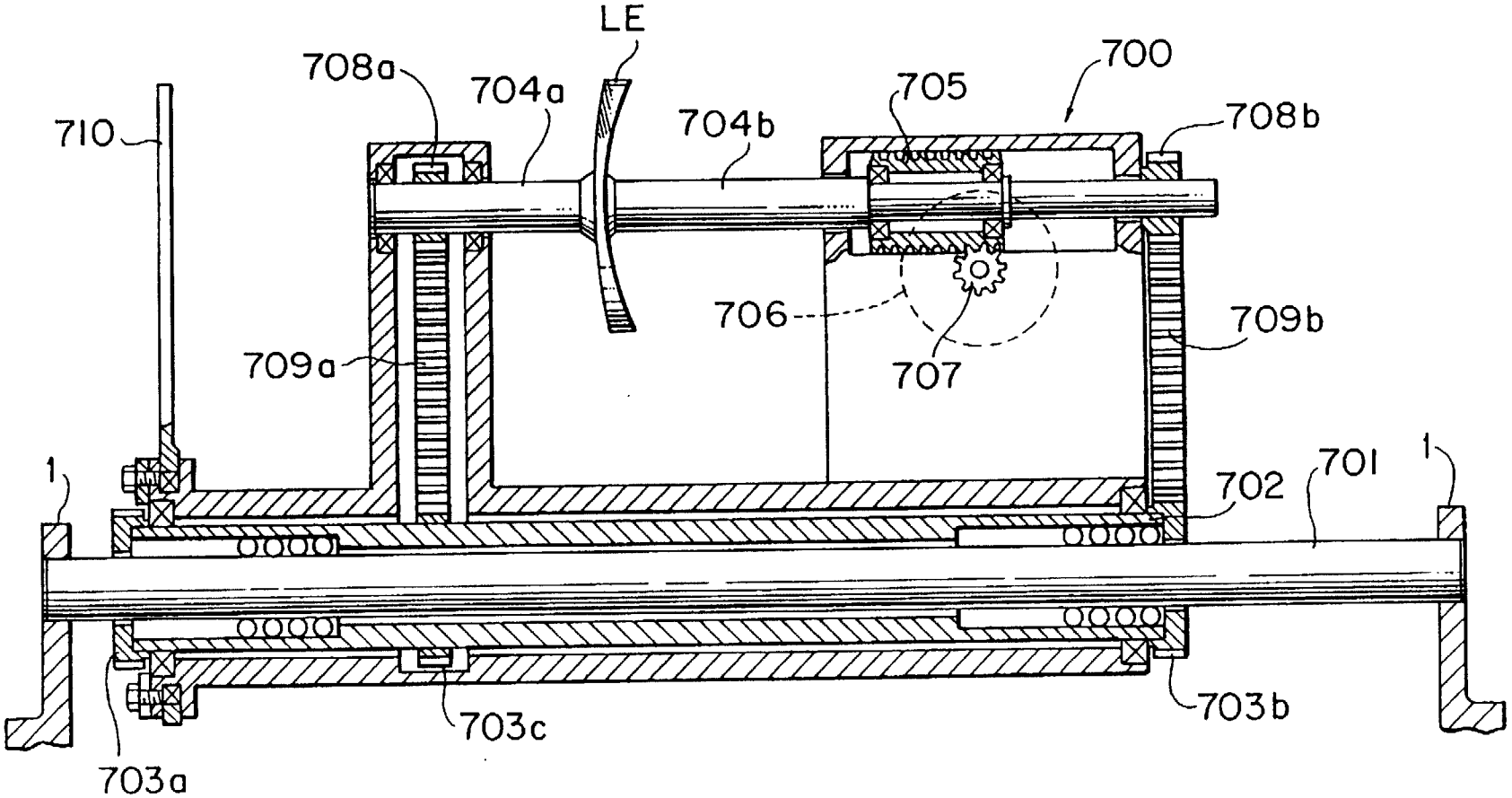
FIG. 2 is a cross-sectional view of a carriage.
Figure 3:
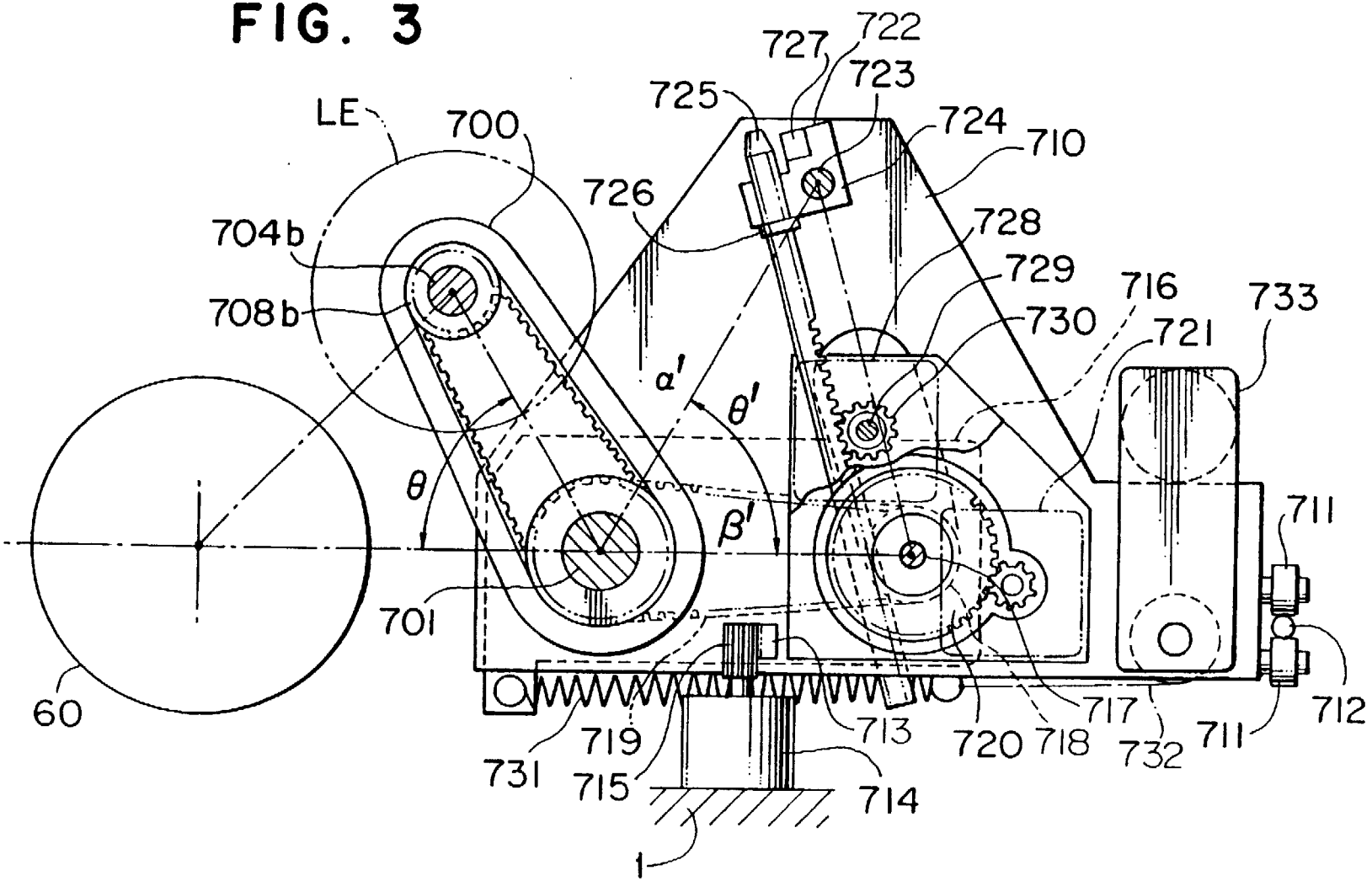
FIG. 3 is a diagram showing a drive mechanism of the carriage, as viewed from the arrow III in FIG. 1.

The construction will be described with reference to FIGS. 1 to 3. FIG. 2 is a cross-sectional view of the carriage. FIG. 3 is a diagram showing a drive mechanism for the carriage, as viewed in a direction indicated by the arrow III in FIG. 1.

A carriage shaft 702 is rotatably and slidably supported on a shaft 701 secured on the base 1, and further, the carriage 700 is rotatably supported on the carriage shaft 702. Timing pulleys 703a, 703b and 703c having the same number of teeth are fixed on a left end, a right end and an intermediate position therebetween of the carriage shaft 702, respectively.

Lens rotating shafts 704a and 704b are coaxially and rotatably supported on the carriage 700, extending in parallel to and at an unchanged distance from the shaft 701. The lens rotating shaft 704b is rotatably supported in a rack 705 which is movable in the axial direction. The rack 705 can be moved in the axial direction by a pinion 707 fixed on a rotational shaft of a motor 706. Thus, a lens LE can be clamped between the rotating shafts 704a and 704b. Pulleys 708a and 708b having the same number of teeth are provided on the lens rotating shafts 704a and 704b and linked through timing belts 709a and 709b with the pulleys 703a and 703b, respectively.

An intermediate plate 710 is rotatably fixed on the left side of the carriage 700. The intermediate plate 710 is provided with two cam followers 711 which clamp a guide shaft 712 which is secured on the base 1, extending in parallel to the shaft 701. The intermediate plate 710 includes a rack 713 which meshes with a pinion 715 attached on a rotational shaft of a motor 714 for lateral movement of the carriage which is secured on the base 1, extending in parallel to the shaft 701. With such an arrangement, the motor 714 can move the carriage 700 in the axial direction of the shaft 701.

A drive plate 716 is securely fixed on the left end of the carriage 700, and a rotational shaft 717 is rotatably provided on the drive plate, extending in parallel to the shaft 701. A pulley 718 having the same number of teeth as the pulleys 708a and 708b is provided on the left end of the rotational shaft 717, and the pulley 718 is linked through a timing belt 719 with the pulley 703a.

A gear 720 is provided on the right end of the rotational shaft 717, and the gear 720 meshes with a gear attached on a motor 721. When the motor 721 is rotated, the gear 720 causes the pulley 718 to rotate through the rotational shaft 717 so that the carriage shaft 702 is rotated through the timing belt 719, thus rotating the lens chuck shafts 704a and 704b through-the pulleys 703a and 703c, the timing belts 709a and 709b, and the pulleys 708a and 708b.

A block 722 is fixed on the drive plate 716 coaxially with the rotational shaft 717 and rotatably, and the motor 721 is secured on the block 722.

A shaft 723 is secured on the intermediate plate 710, extending in parallel to the shaft 701, and a correction block 724 is rotatably fixed on the shaft 723. A round rack 725 extends in parallel to the shortest line segment connecting the axis of the rotational shaft 717 and the axis of the shaft 723, and the round rack 725 is slidably provided, passing through a hole bored in the block 724. A stopper 726 is fixed on the round rack 725 so that it can only slide below the contact position with the correction block 724.

A sensor 727 is installed on the intermediate plate 710 so as to detect the contact condition between the stopper 726 and the correction block 724. Therefore, the grinding condition of the lens can be checked.

A pinion 730 fixed on a rotational shaft 729 of a motor 728 which is secured on the block 722 meshes with the round rack 725, so that an axial distance r' between the rotational shaft 717 and the shaft 723 can be controlled by the motor 728.

Further, with this construction, a linear relation is maintained between the axial distance r' and the rotational angle of the motor 728.

A hook of a spring 731 is hung on the drive plate 716, and a wire 732 is hung on a hook on the other side of the spring 731. A drum is attached on a rotational shaft of a motor 733 secured on the intermediate plate 710, so that the wire 732 can be wound on the drum. Thus, the grinding pressure of the abrasive wheel means 60 for the lens LE can be changed.

(B) Lens Frame Portion and Template Configuration Measuring Section (Tracer Section)

(a) Construction

The construction of a lens frame portion and template configuration measuring section 2 will be described with reference to FIGS. 4 to 8.

Figure 4:
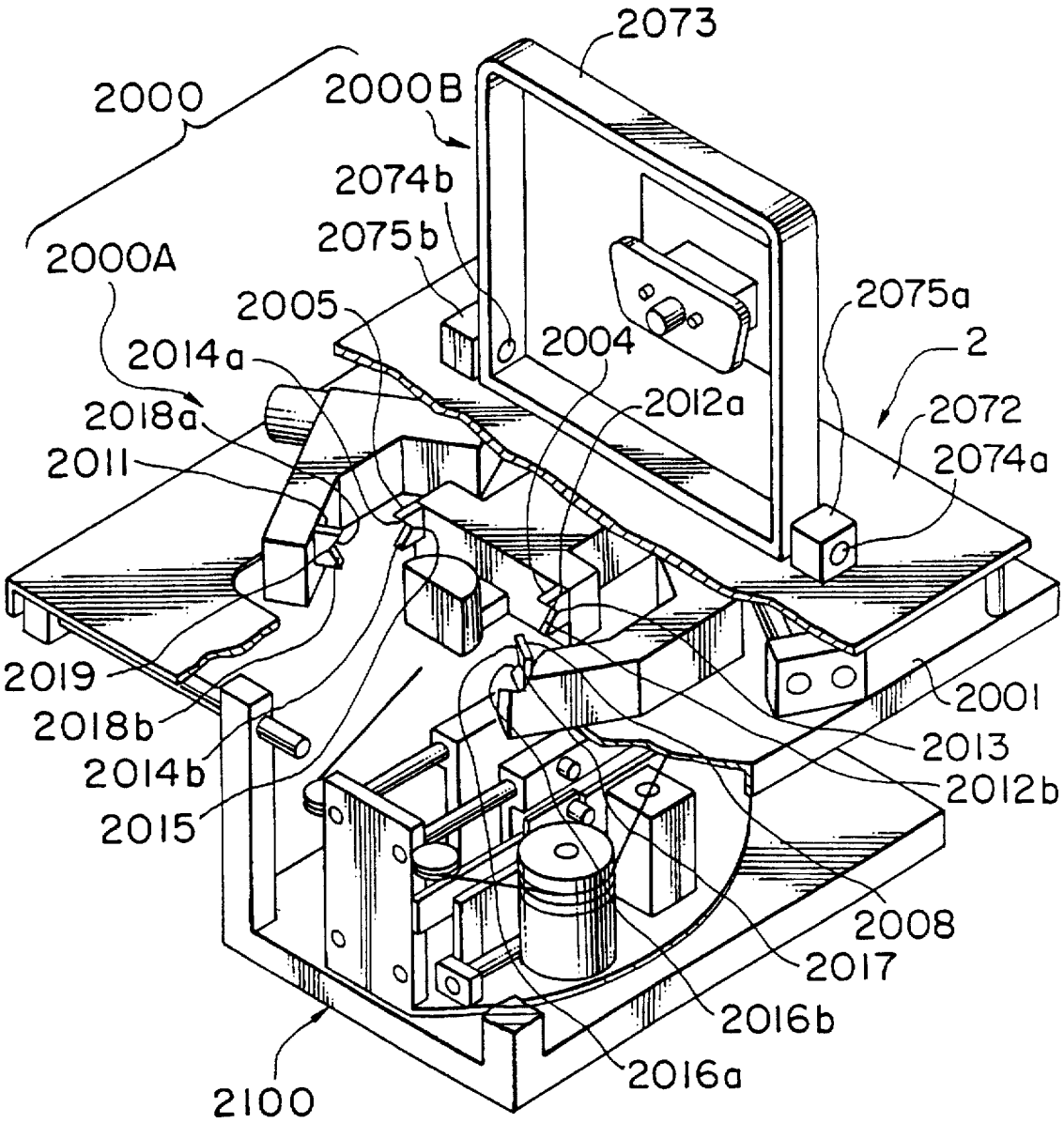
FIG. 4 is a perspective view showing a measurement section for measuring the configurations of lens frame portions and templates according to one embodiment of the invention.

FIG. 4 is a perspective view showing a lens frame portion and template configuration measuring section in accordance with this embodiment. This section is incorporated in the body of the lens grinding apparatus and is generally composed of two sections: a frame and template holding section 2000 for holding a frame and templates and a measurement section 2100 for performing digital measurement of the configurations of lens frame portions in the frame and templates. The frame and template holding section 2000 is composed of two sections: a frame holding section 2000A and a template holding section 2000B. (The explanation of the template holding section 2000B will be omitted.)

Frame Holding Section

Figure 5:
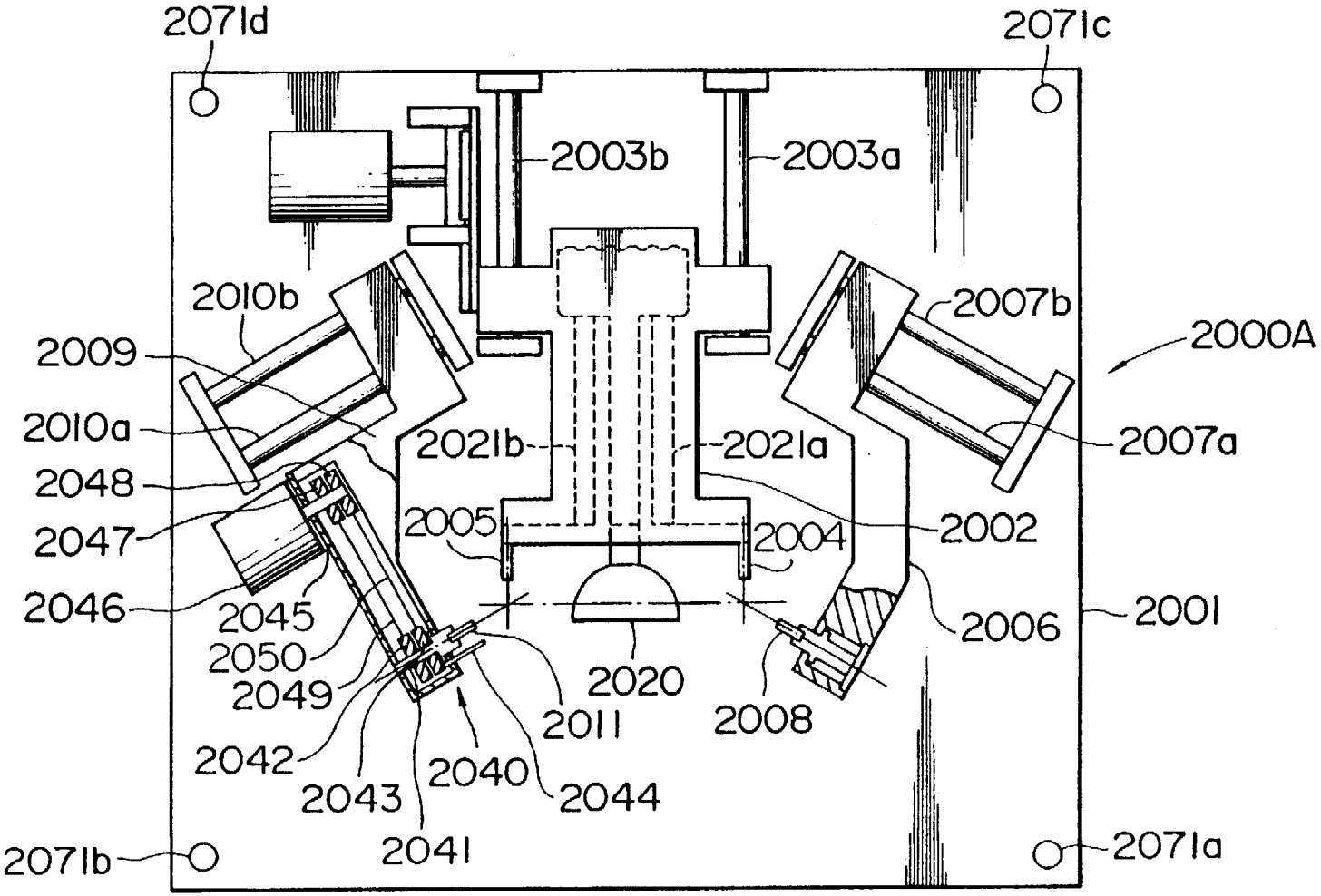
FIG. 5 is a diagram showing a frame holding section 2000A.

Referring to FIG. 5 showing the frame holding section 2000A, the average geometrical centers of a pair of lens frame portions when the eyeglasses frame is set in the frame holding section 2000A are established as reference points $O_R$ and $O_L$, and the straight line connecting these two points is regarded as a reference line.

The frame holding section 2000A includes a casing 2001. A center arm 2002 is slidably mounted on guide shafts 2003a and 2003b attached on the surface of the casing 2001, and frame supports 2004 and 2005 are provided on distal ends of the center arm 2002 and located at the same interval as the distance between the points $O_R$ and $O_L$.

Similarly, a right arm 2006 is slidably mounted on guide shafts 2007a and 2007b, and a left arm 2009 is slidably mounted on guide shafts 2010a and 2010b. Also, frame supports 2008 and 2011 are rotatably supported on distal ends of the right and left arms 2006 and 2009, respectively.

The center arm 2002 slides in a direction perpendicular to the reference line so that the frame supports 2004 and 2005 pass through the points $O_R$ and $O_L$. The right arm 2006 slides in a direction at an angle of about 30° from the reference line so that the frame support 2008 passes through the point $O_R$, and the left arm 2009 slides in a direction at an angle of about 30° from the reference line so that the frame support 2011 passes through the point $O_L$.

Each of the frame supports 2004, 2005, 2008 and 2011 has two oblique surfaces intersecting with each other. Ridgelines defined by the pairs of oblique surfaces exist on the same plane (the measurement plane), and also, rotational axes of the frame supports 2008 and 2011 exist on this measurement plane.

Further, the center arm 2002 is provided with a semicircular frame support 2020 which is slidably mounted on guide shafts 2021a and 2021b attached on the center arm 2002, and the frame support 2020 is usually drawn toward the center arm by means of a spring.

Figure 6:
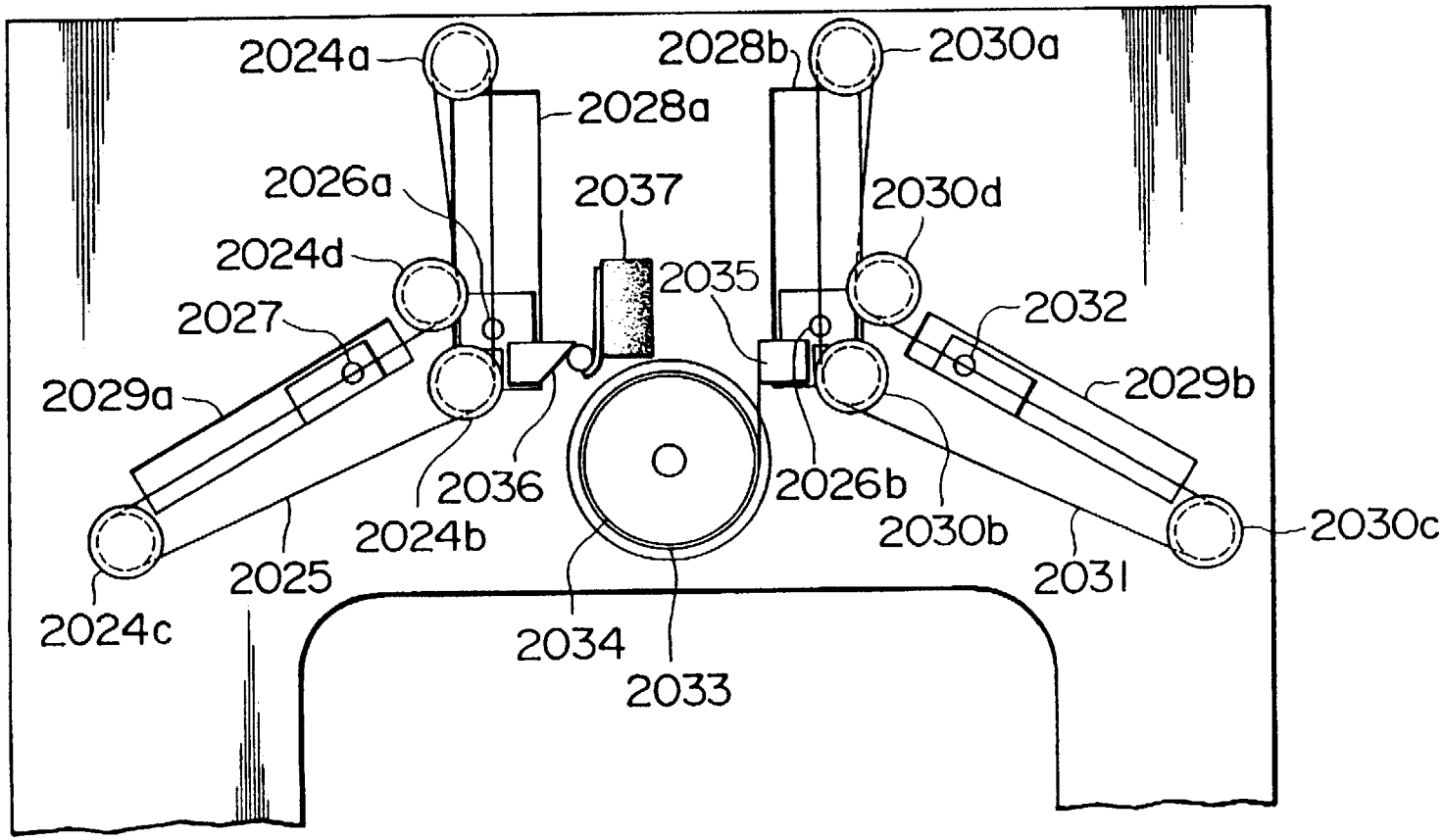
FIG. 6 is a diagram showing one portion of a casing 2001, as viewed from the rear side.

FIG. 6 is a diagram showing a portion of the casing 2001, as viewed from the rear side.

Pulleys 2024a, 2024b, 2024c and 2024d are rotatably supported on the rear surface of the casing 2001. A wire 2025, which is stretched over the pulleys 2024a to 2024d, is firmly attached to a pin 2026 embedded in the center arm 2002 and a pin 2027 embedded in the right arm 2006, these pins being projected from the rear surface through holes 2028a and 2029a of the casing 2001.

Likewise, pulleys 2030a, 2030b, 2030c and 2030d are rotatably supported on the rear surface of the casing 2001. A wire 2031, which is stretched over the pulleys 2030a to 2030d, is firmly attached to a pin 2026b embedded in the center arm 2002 and a pin 2032 embedded in the left arm 2009, these pins being projected from the rear surface through holes 2028b and 2029b of the casing 2001. Also, on the rear surface of the casing 2001, a constant torque spring 2033 for constantly drawing the center arm 2002 toward the points $O_R$ and $O_L$ is attached on a drum 2034 which is rotatably supported on the rear surface of the casing 2001, one end of the constant torque spring 2033 being firmly attached to a pin 2035 embedded in the center arm 2002.

A claw 2036, which is embedded in the center arm 2002, is in contact with a microswitch 2037 attached on the rear surface of the casing 2001 when the frame is not held. The claw 2036 serves to judge the frame holding condition.

A rim thickness measuring section 2040 for measuring the thickness of a rim of a frame portion is incorporated in the left arm 2009.

A pulley 2042 is fixed on a rotational shaft 2041 of the frame support 2011 so as to rotate integrally with the frame support 2011. A pulley 2043 which rotates irrespective of the rotation of the frame support 2011 is supported on the rotational shaft 2041, and a rim thickness measuring pin 2044 is embedded in the pulley 2043.

A hollow rotational shaft 2045 is rotatably supported on the left arm 2009. A potentiometer 2046 is installed on one end of the rotational shaft 2045, and a pulley 2047 is attached on the other end. A wire 2049 is stretched between the pulleys 2042 and 2047, with opposite ends of the wire 2049 being firmed attached on the respective pulleys. The potentiometer 2046 and the frame support 2011 constantly rotate in the same direction in cooperation.

Figure 7:
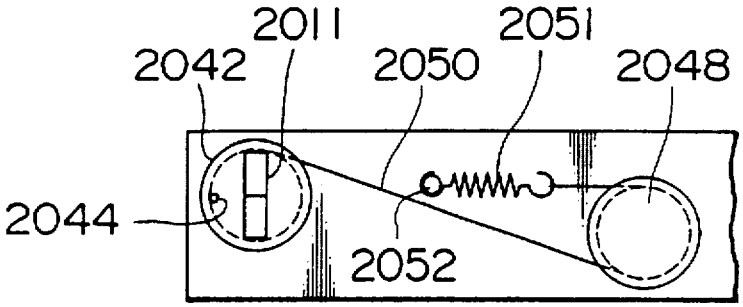
FIG. 7 is a diagram for explaining a rim thickness measuring mechanism.

Referring to FIG. 7, one end of a wire 2050 is firmly attached to the pulley 2042, and an intermediate portion of the wire 2050 is fixed on a pulley 2048, the other end of the wire 2050 being hooked on a pin 2052 embedded in the left arm 2009 through a spring 2051. In accordance with the movement of the rim thickness measuring pin 2044, the shaft of the potentiometer 2046 is rotated.

Figure 8:
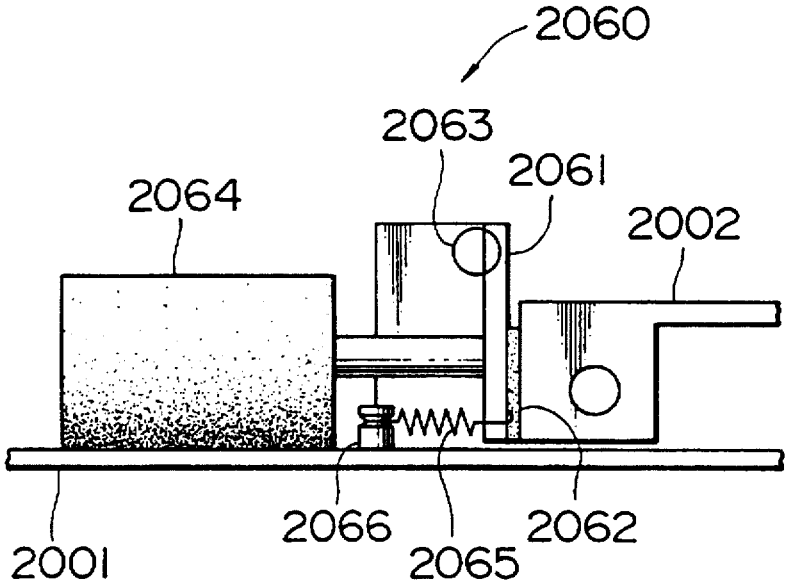
FIG. 8 is a diagram for explaining a frame fastening mechanism.

Referring to FIG. 8, a pressing plate 2061 having a brake rubber 2062 adhered on one surface is attached on the casing 2001 rotatably by means of a shaft 2063 fixed on the pressing plate 2061, and one end of a sliding shaft of a solenoid 2064 provided on the casing 2001 is attached on the pressing plate 2061. One end of a spring 2065 is hooked on the pressing plate 2061, and the other end of it is hooked on a pin 2066 embedded in the casing 2001, so as to pull the pressing plate 2061 constantly in such a direction that the brake rubber 2062 will not abut against the center arm 2002. When the solenoid 2064 functions to press the pressing plate 2061 against the spring 2065, the brake rubber 2062 abuts against the center arm 2002, to thereby fix the center arm 2002, and the right arm 2006 and the left arm 2009 which move in cooperation with the center arm 2002.

Measurement Section

Figure 9:
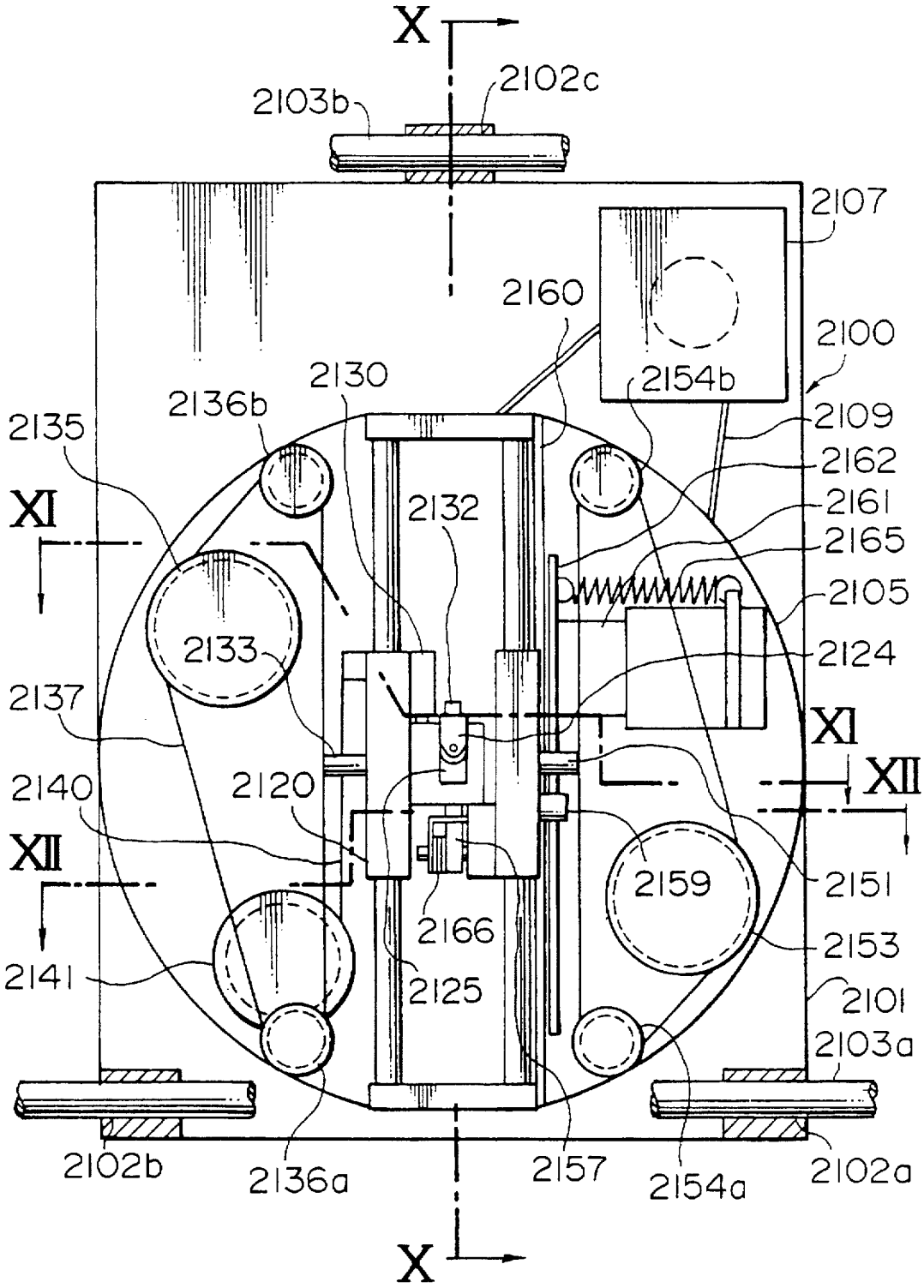
FIG. 9 is a plan view of the measurement section.
Figure 10:
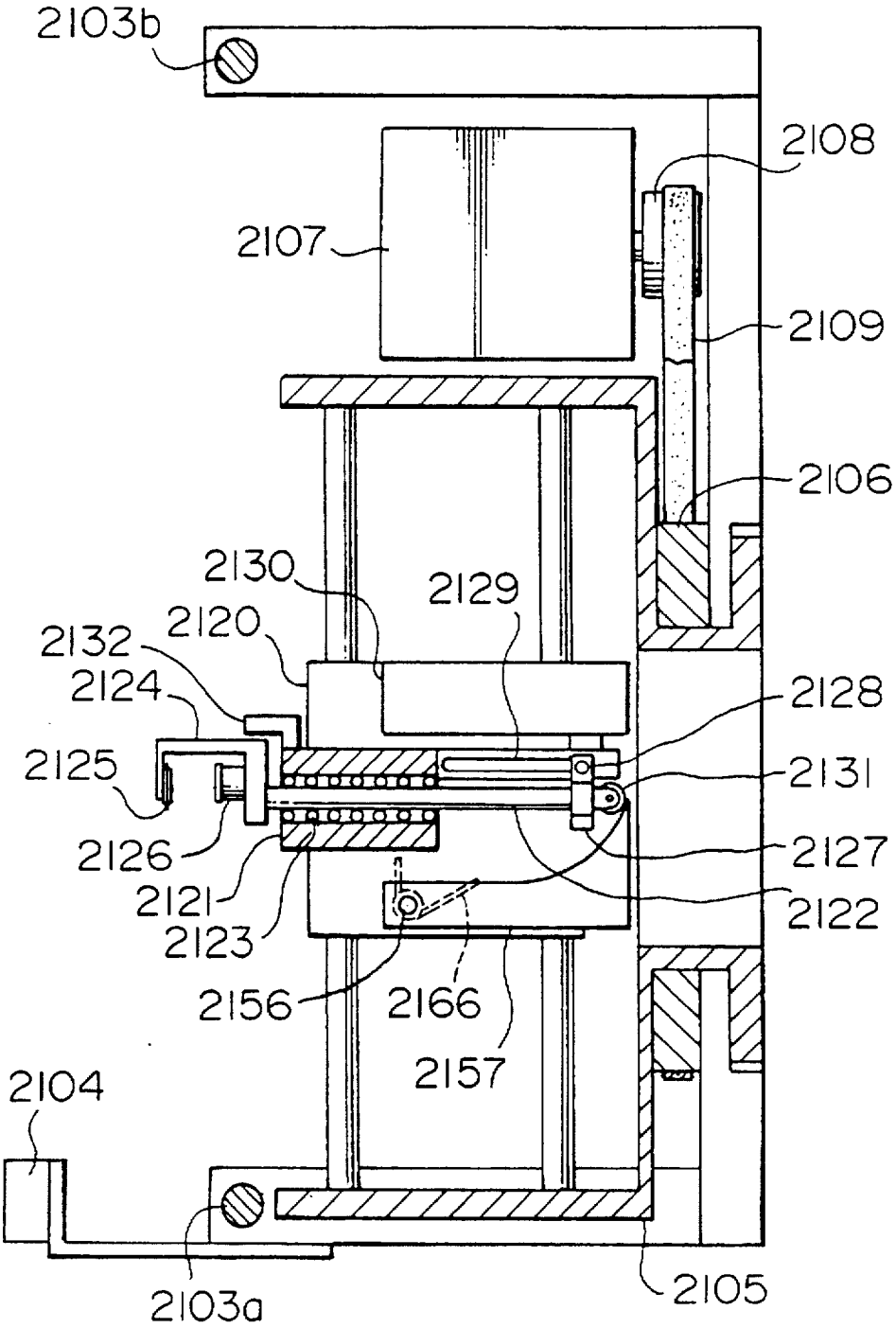
FIG. 10 is a cross-sectional view taken along the line X—X of FIG. 9.

Next, the construction of the measurement section 2100 will be described with reference FIGS. 9 to 12. FIG. 9 is a plan view of the measurement section, and FIG. 10 is a cross-sectional view taken along the line X—X of FIG. 9.

A movable base 2101 has shaft holes 2102a, 2102b, and 2102c and is slidably supported by shafts 2103a and 2103b attached to the casing 2001. Further, embedded in the movable base 2101 is a lever 2104, by means of which the movable base 2101 can be slid, thereby bringing the rotational center of a rotating base 2105 to the positions $O_R$ and $O_L$ on the frame portion and template holding section 2000. The rotating base 2105, on which a pulley 2106 is formed, is rotatably supported by the movable base 2101. Stretched between the pulley 2106 and a pulley 2108, which is attached to the rotating shaft of a pulse motor 2107 mounted on the movable base 2101, is a belt 2109, by means of which the rotation of the pulse motor 2107 is transmitted to the rotating base 2105.

Figure 11:
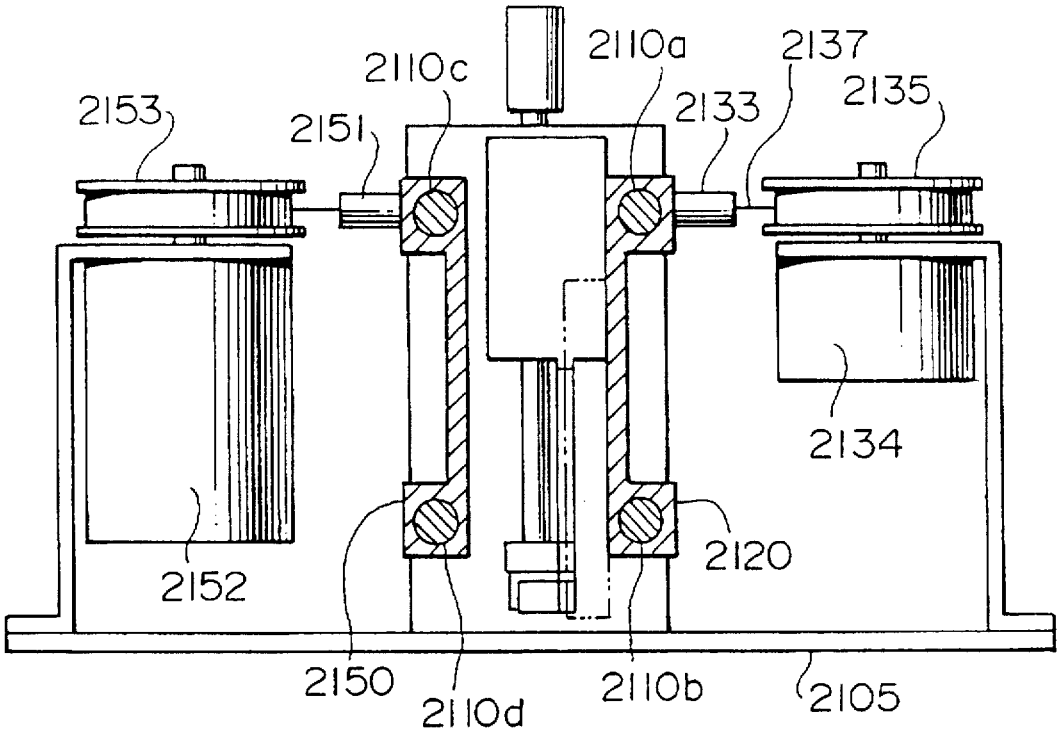
FIG. 11 is a cross-sectional view taken along the line XI—XI of FIG. 9.
Figure 12:
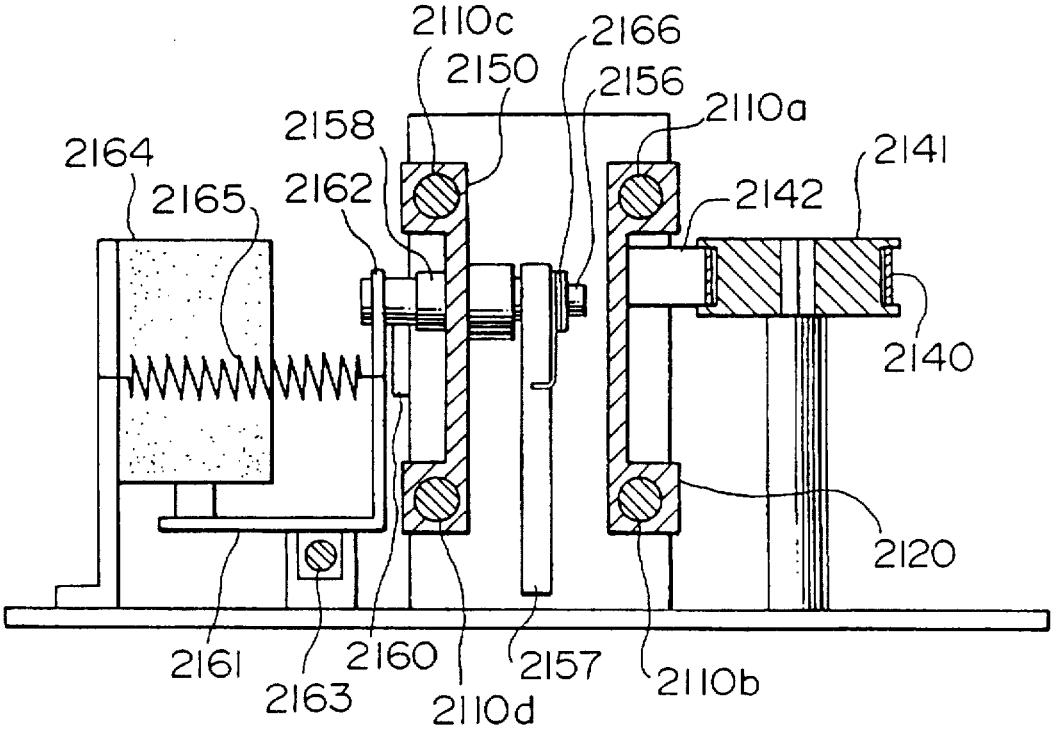
FIG. 12 is a cross-sectional view taken along the line XII—XII of FIG. 9.

As shown in FIG. 11, four rails 2110a, 2110b, 2110c, and 2110d are attached to the rotating base 2105. A gauge head section 2120 is slidably mounted on the rails 2110a and 2110b. Formed in this gauge head section 2120 is a vertical shaft hole 2121, into which a gauge head shaft 2122 is inserted.

A ball bearing 2123 is provided between the gauge head shaft 2122 and the shaft hole 2121, whereby the vertical movement and the rotation of the gauge head shaft 2122 are smoothed. Attached to the upper end of the gauge head shaft 2122 is an arm 2124, and, rotatably supported by the upper section of this arm 2124 is an abacus-bead-like V-groove gauge head 2125 adapted to abut against the V-shaped groove of the lens frame portions.

A cylindrical template measurement roller 2126 which is adapted to abut against the edge of a template is rotatably supported by the lower section of the arm 2124. The outer peripheral surfaces of the V-groove gauge head 2125 and the template measurement roller 2126 are located in the center line of the gauge head shaft 2122.

In a position below the gauge head shaft 2122, a pin 2128 is embedded in a ring 2127 which is rotatably mounted on the gauge head shaft 2122, with the movement in the rotating direction of this pin 2128 being limited by an elongated hole 2129 formed in the gauge head section 2120. Attached to the tip end of the pin 2128 is the movable section of a potentiometer 2130 of the gauge head section 2120, the moving amount in the vertical direction of the gauge head shaft 2122 being detected by means of this potentiometer 2130.

A roller 2131 is rotatably supported by the lower end section of the gauge head shaft 2122. Also, a claw 2132 is embedded in the gauge head section 2120.

A pin 2133 is embedded in the gauge head section 2120, and a pulley 2135 is attached to the shaft of a potentiometer 2134 which is attached to the rotating base 2105. Pulleys 2136a and 2136b are rotatably supported by the rotating base 2105, and a wire 2137 which is firmly attached to the pin 2133 is stretched between these pulleys 2136a and 2136b and is wound around the pulley 2135. Thus, the moving amount of the gauge head section 2120 is detected by the potentiometer 2134.

Further, a constant torque spring 2140 which is adapted to constantly pull the gauge head section 2120 toward the side of tip of the arm 2124 is attached to a drum 2141 which is rotatably supported by the rotating base 2105, one end of the constant torque spring 2140 being firmly attached to a pin 2142 embedded in the gauge head section 2120.

Slidably mounted on the rails 2110c and 2110d on the rotating base 2105 is a gauge head driving section 2150, in which a pin 2151 is embedded, and a pulley 2153 is attached to the rotating shaft of a motor 2152 attached to the rotating base 2105. Pulleys 2154a and 2154b are rotatably supported by the rotating base 2105, and a wire 2155 firmly attached to a pin 2151 is stretched between these pulleys 2154a and 2154b and is wound around the pulley 2153, whereby the rotation of the motor 2152 is transmitted to the gauge head driving section 2150.

The gauge head driving section 2150 abuts against the gauge head section 2120, which is pulled toward the gauge head driving section 2150 by the constant torque spring 2140, and, by moving the gauge head driving section 2150, the gauge head section 2120 can be moved to a predetermined position.

Further, rotatably supported by the gauge head driving section 2150 is a shaft 2156, one end of which is attached to an arm 2157 abutting against the roller 2131 that is rotatably supported by the lower end section of the gauge head shaft 2122, and the other end of which is attached to an arm 2158 rotatably supporting a roller 2159. One end of a torsion coil spring 2166 is hooked on the arm 2157 in such a manner that the roller 2159 comes to abut against a stationary guide plate 2160 which is firmly attached to the rotating base 2105, and the other end of this torsion coil spring 2161 is firmly attached to the gauge head driving section 2150, so that, when the gauge head driving section 2150 moves, the roller 2159 moves in the vertical direction along the guide plate 2160.

The vertical movement of the roller 2159 causes the shaft 2156 to rotate, and the arm 2157 firmly attached to the shaft 2156 also rotates round the shaft 2156, causing the gauge head shaft 2122 to move in the vertical direction. Rotatably mounted on the rotating base 2105 is a shaft 2163, to which a movable guide plate 2161 is firmly attached. One end of the sliding shaft of a solenoid 2164 mounted on the rotating base 2105 is attached to the movable guide plate 2161. One end of a spring 2165 is hooked on the rotating base 2105, and the other end thereof is hooked on the movable guide plate 2161, normally pulling the movable guide plate 2161 to a position where its guide section 2162 of the movable guide plate 2161 does not abut against the roller 2159. When the solenoid 2164 operates to pull up the movable guide plate 2161, the guide section 2162 of this movable guide plate 2161 moves to a position where it is parallel to the stationary guide plate 2160, allowing the roller 2159 to abut against the guide section 2162 and move along the guide section 2162.

(b) Operation

Next, the operation of the above-described lens frame portion and template configuration measurement device 2 will be described with reference to FIGS. 5 to 17.

Measurement of Lens Frame Portion Configuration

First, the operation of measuring an eyeglasses frame will be described.

Either the left or the right lens frame portion of the eyeglasses frame 500 is selected for measurement, and the measurement section 2100 is moved to the measurement side by means of a lever 2104 which is firmly attached to the movable base 2101.

By pulling the frame support 2020, the distance between the frame support 2020 and the center arm 2002 is enlarged to a sufficient degree. After abutting the front section of the eyeglasses frame against the oblique surfaces 2012a, 2012b, 2014a and 2014b of the frame supports 2004 and 2005, the frame support 2020 is returned to the initial position and abutted against the center section of the eyeglasses frame. Then, while pressing the center arm 2002, the rim thickness measuring pins 2044 are pressed downwardly by the rim portions of the eyeglasses frame, and at the same time, the left and right rim portions are abutted against the oblique surfaces 2016a, 2016b, 2018a and 2018b of the frame supports 2008 and 2011.

In this embodiment, the frame supports 2004, 2005, 2008 and 2011 function in cooperation, and they are pulled toward the points OR and On by means of the constant torque spring 2033 whereas the frame support 2020 is pulled toward the center arm by the spring 2022. Therefore, by holding the eyeglasses frame by the frame supports 2004, 2005, 2008, 2011 and 2020, each lens frame portion can be retained by forces in three directions toward the geometrical center of the lens frame portion, and also, the horizontal center of the frame can be retained at the middle point between the points $O_R$ and $O_L$ by means of the frame support 2020. Moreover, since the frame supports 2008 and 2011 rotate inside of the plane defined by the ridgelines 2013, 2015, 2017 and 2019 of the four frame supports, the center of the V-groove of the lens frame can be constantly retained at the center positions of the frame supports 2004, 2005, 2008 and 2011 and inside of the measurement plane.

Figure 13:
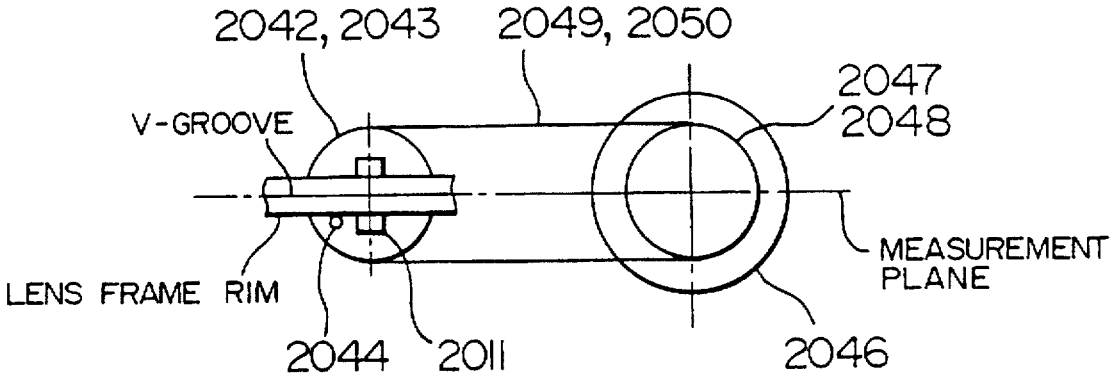
FIGS. 13 and 14 are diagrams illustrative of a measurement method.

Referring to FIG. 13, the rim portion of the lens frame presses the rim thickness measuring pin 2044 downwardly. When the V-groove is in parallel to the measurement plane, the movement amount of the rim thickness measuring pin 2044 with respect to the ridgeline 2019 defined by the oblique surfaces 2018a and 2018b of the frame support 2011 can be detected by the potentiometer 2046.

Figure 14:
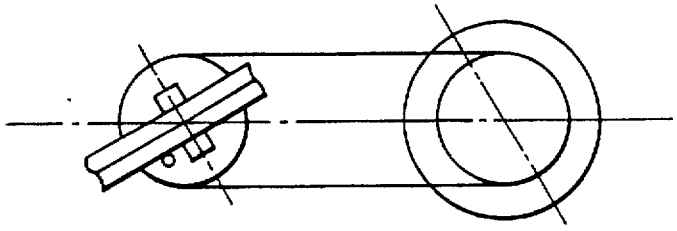

Referring to FIG. 14, when the V-groove is inclined at an angle with respect to the measurement plane, the frame support 2011 is inclined along the rim portion. Since the potentiometer 2046 is also inclined at the same angle as the inclination of the frame support 2011, the rim thickness can always be measured with reference to the ridgeline 2019.

The rim thickness data thus obtained are compared with the lens edge thickness and utilized for determining the optimum tapered edge position such that the rim of the frame and the front refractive surface of the lens will be located properly.

When a tracing switch on the operation panel is depressed with the frame set as described above, the solenoid 2064 operates to fix the center arm 2002, the right arm 2006 and the left arm 2009.

Figure 15:
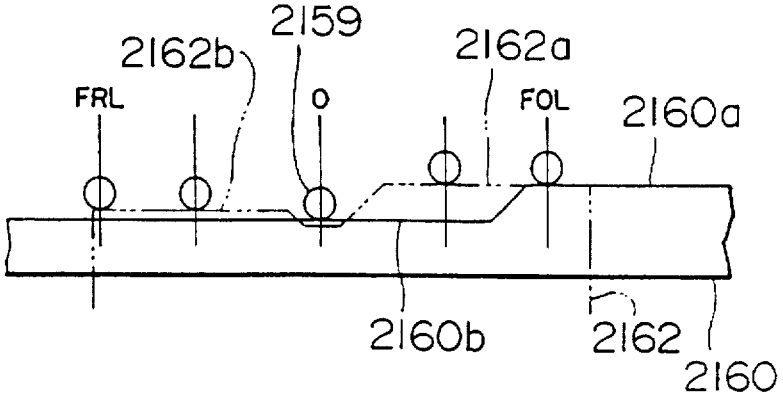
FIGS. 15 and 16 are diagrams for explaining the vertical movement of a gauge head.
Figure 16:
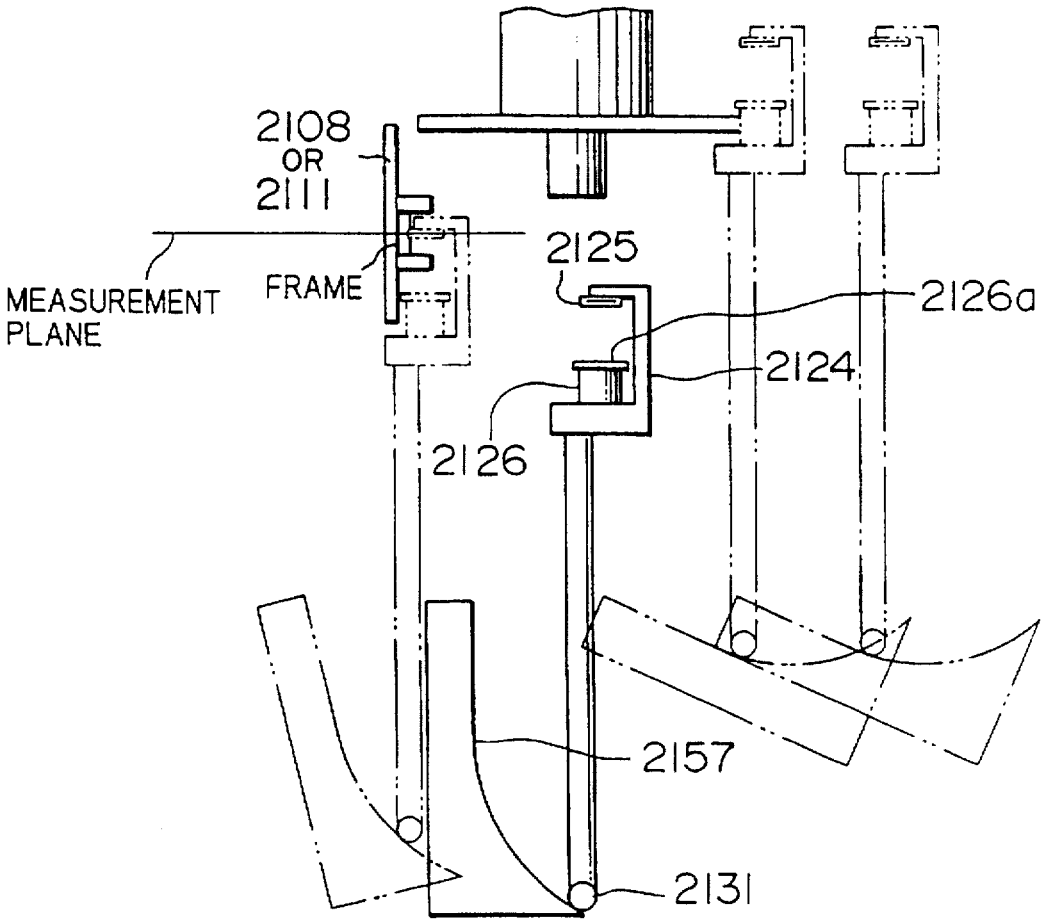

In FIGS. 15 and 16, the roller 2159 of the gauge head driving section 2150 is at the reference position O, and the pulse motor 2107 is rotated a predetermined angle, turning the rotating base 2105 such that the moving direction of the gauge head driving section 2150 coincides with the moving direction of the frame support 2008 or 2011.

Subsequently, the guide section 2162 of the movable guide plate 2161 is moved to a predetermined position by the solenoid 2164, and the gauge head driving section 2150 is moved in the direction of the frame support 2008 or 2011. This causes the roller 2159 to move from the guide section 2160a of the stationary guide plate 2160 to the guide section 2162b of the movable guide plate 2161, and the gauge head shaft 2122 is raised by the arm 2157, with the V-groove gauge head 2125 being retained at the level of the reference plane for measurement.

Further, when the gauge head driving section 2150 is moved, the V-groove gauge head 2125 is inserted into the V-groove of the lens frame portion, and the gauge head section 2120 stops its movement at the frame, the gauge head driving section 2150 moving to the frame limit to stop there. Subsequently, the pulse motor 2107 is rotated each time by a unit rotation pulse number which has previously been set. At this time, the gauge head section 2120 moves along the guide shaft 2110a and 2110b in accordance with the radius vector of the lens frame portion, the amount of this movement being read by the potentiometer 2134. The gauge head shaft 2122 moves up and down following the curve of the lens frame portion, the amount of this movement being read by the potentiometer 2130. From the rotation angle θ of the pulse motor 2107, the read amount r of the potentiometer 2134, and the read amount z of the potentiometer 2130, the lens frame portion configuration is measured as $(r_n, \theta_n, z_n)$ (n=1, 2, . . . , N). The measurement data $(r_n, \theta_n, z_n)$ is subjected to polar-orthogonal coordinate transformation, and, from arbitrary four points $(x_1, y_1, z_1)$, $(x_2, y_2, z_2)$, $(x_3, y_3, z_3)$, and $(x_4, y_4, z_4)$ of the data $(x_n, y_n, z_n)$ thus obtained, the frame curve $C^F$ is obtained (by use of the same formula as in obtaining the lens curve).

Further, the distances between the data $(x_n, y_n, z_n)$ (n=1, 2, . . . , N) are calculated, and the peripheral length of the eyeglass contour is approximately obtained by adding them, and expressed as $\pi_f$.

Figure 17:
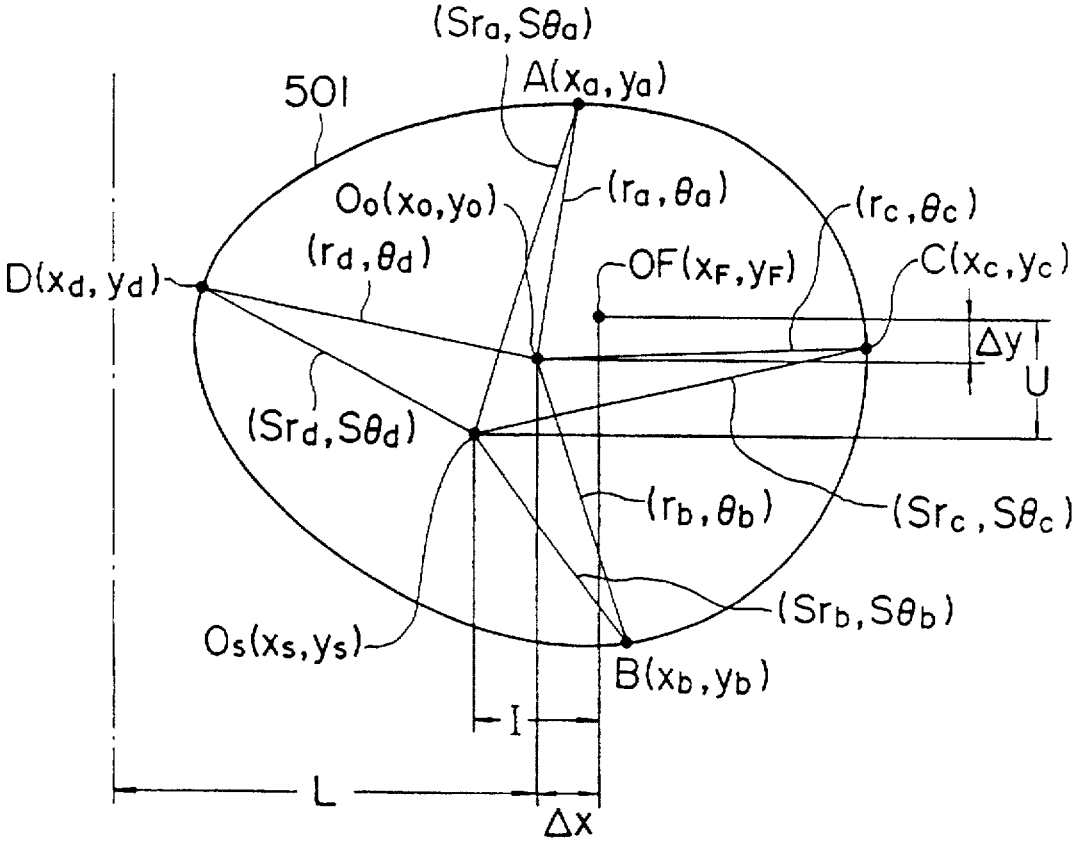
FIG. 17 is a diagram for explaining a coordinate transformation.

Moreover, referring to FIG. 17, selected from among the x and y components $(x_n, y_n)$ of $(x_n, y_n, z_n)$ are a measurement point A $(x_a, y_a)$ having the maximum value in the X-axis direction, a measurement point B $(x_b, y_b)$ having the minimum value in the X-axis direction, a measurement point C $(x_c, y_c)$ having the maximum value in the Y-axis direction, and a measurement point D $(x_d, y_d)$ having the minimum value in the Y-axis direction, and, the geometrical center $O_F$ $(X_F, Y_F)$ of the lens frame portion is obtained as:

$$(x_F, y_F) = \left( \frac{x_c + x_b}{2}, \frac{y_e + y_d}{2} \right) \quad (1)$$

From the distance L between the known frame center and the rotational center $O_o$ ($x_o$, $y_o$) of the gauge head section 2120 and the deviation amount ($\Delta x$, $\Delta y$) between $O_o$ and $O_F$, ½ of the frame pupil distance FPD between the geometrical centers of the lens frame portions is obtained as:

$$\begin{aligned} FPD/2 &= (L - \Delta_x) \\ &= \{L - (x_F - x_D)\} \end{aligned} \quad (2)$$

Next, from the pupillary distance PD designated at the input section 4, the inner adjustment amount I is obtained as:

$$\begin{aligned} I &= \left( \frac{FPD}{2} - \frac{PD}{2} \right) \\ &= \{L - (x_P - x_O) - PD/2\} \end{aligned} \quad (3)$$

Further, on the basis of an inputted upper adjustment amount U, the position $O_s$ ($x_s$, $y_s$), where the optical center of the eyeglass lens to be processed should be located, is obtained as follows:

$$O_3(x_3, y_3) = (x_P + I, y_F + U) = \left\{ \frac{x_a + x_b}{2} + L - (xP - xO) - \frac{PD}{2}, \frac{y_e + y_d}{2} + U \right\} \quad (4)$$

From this $O_s$, processing data ($_s r_n$, $_s\theta_n$) (n=1, 2, . . . . N) is obtained through transformation of ($x_n$, $y_n$) into polar coordinates having $O_s$ as the center.

In the device of this embodiment, the configuration measurement can be performed on each of the right and left lens frame portions, or, alternatively, it may be performed on only one of them, applying inverted data to the remaining frame portion.

(C) Unprocessed Lens Configuration Measuring Section (a) Construction

Figure 18:
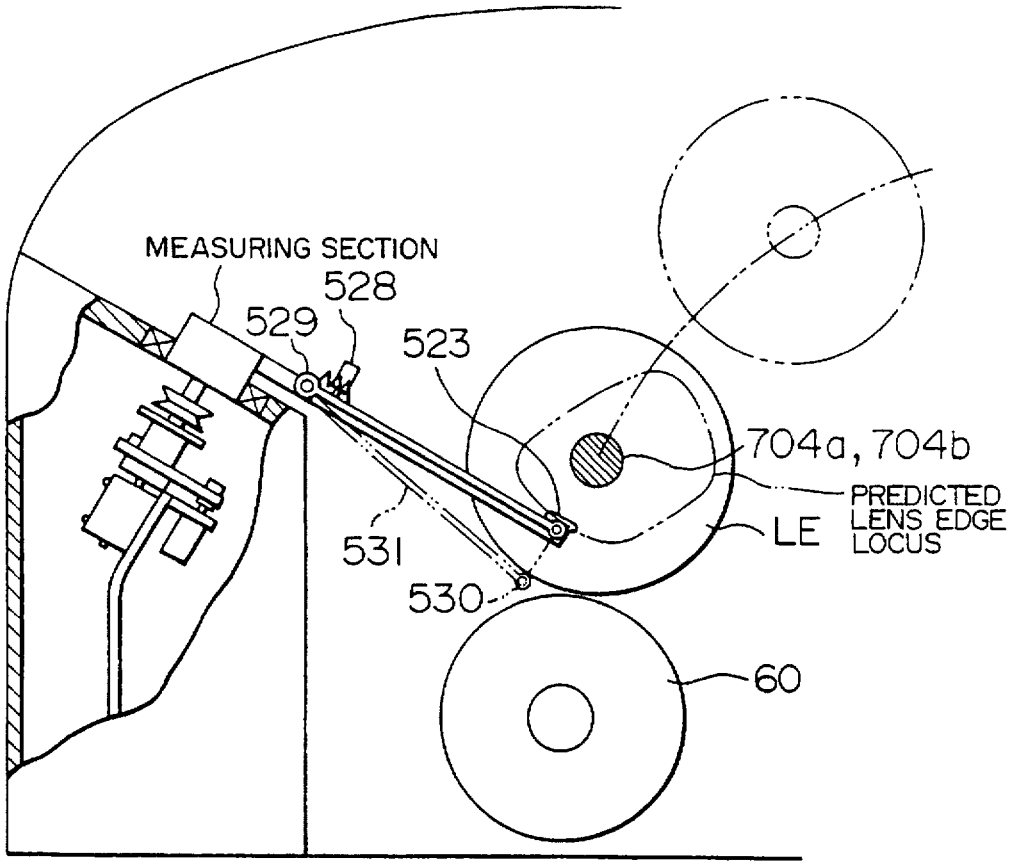
FIG. 18 is a schematic diagram showing the general construction of an unprocessed lens configuration measuring section.

FIG. 18 is a schematic diagram showing the general construction of the unprocessed lens configuration measuring section for detecting, prior to the grinding, the curve value, the edge thickness, etc. of the lens ground under predetermined conditions. The construction of this measuring section will be described in detail with reference to FIGS. 19 and 20.

Figure 19:
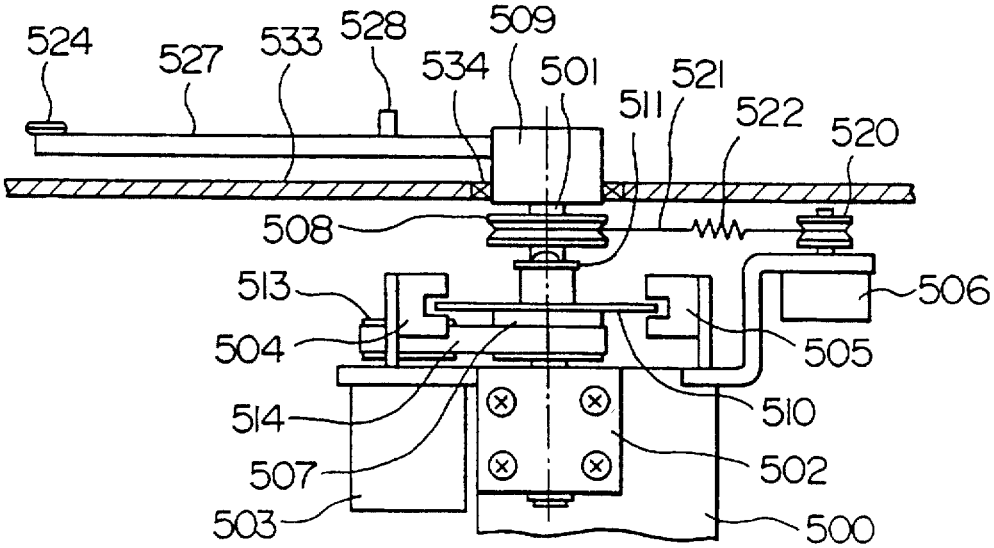
FIG. 19 is a cross-sectional view of the unprocessed lens configuration measuring section.
Figure 20:
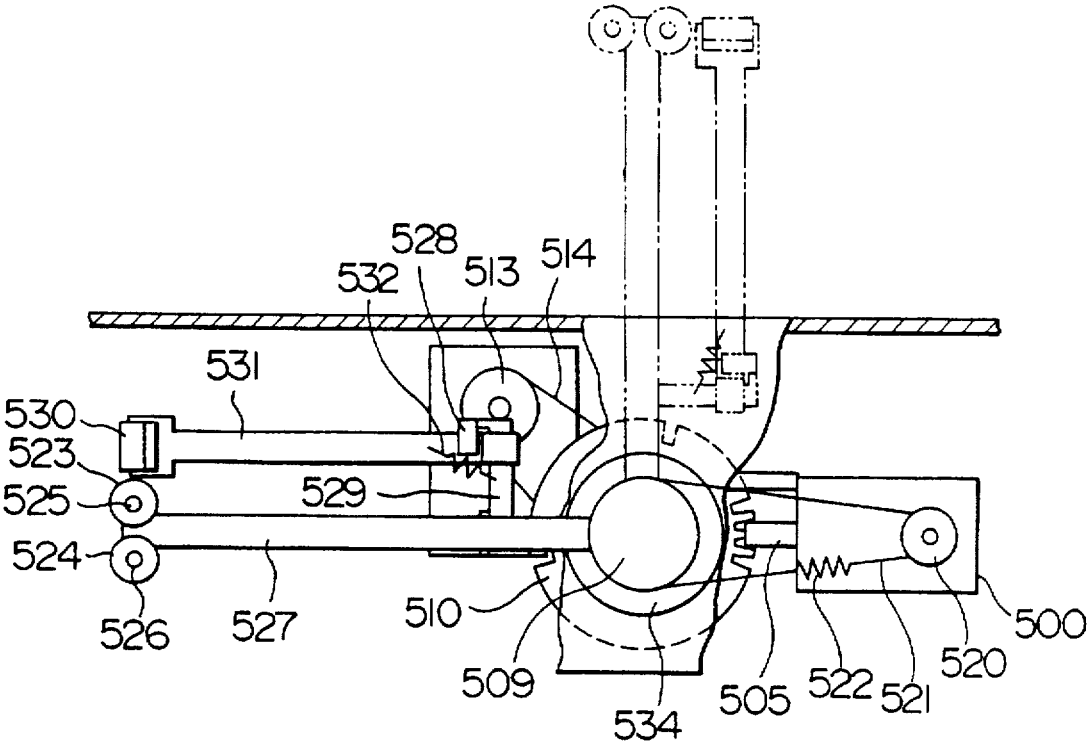
FIG. 20 is a plan view of the unprocessed lens configuration measuring section.

FIG. 19 is a cross-sectional view of the unprocessed lens configuration measuring section 5, and FIG. 20 is a plan view of the same.

A shaft 501 is rotatably mounted on a box 500 through the intermediation of a bearing 502. Further mounted on the box 500 are a DC motor 503, photoswitches 504 and 505, and a potentiometer 506.

A pulley 507 is rotatably mounted on the shaft 501. Further mounted on the shaft 501 are a pulley 508 and a flange 509.

Mounted on the pulley 507 are a sensor plate 510 and a spring 511.

Figure 21:
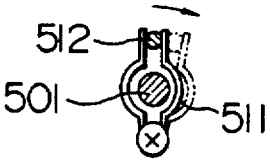
FIG. 21 is a diagram for explaining the operation of a spring and a pin.

As shown in FIG. 21, the spring 511 is attached to the pulley 508 such that it holds a pin 512. As a result, when the spring 511 rotates with the pulley 507, the spring 511 exerts a resilient force on the pin 512 to be rotated, which is attached to the rotatable pulley 508. If the pin 512 moves in, for example, the direction indicated by the arrow independently of the spring 511, the above-mentioned resilient force acts such as to restore the pin 512 to the original position.

Attached to the rotating shaft of the motor 503 is a pulley 513, and the rotation of the motor 503 is transmitted to the pulley 507 through a belt 514 stretched between the pulleys 513 and 507.

The rotation of the motor 503 is detected and controlled by the photoswitches 504 and 505 through the sensor plate 510 attached to the pulley 507.

Rotation of the pulley 507 causes the pulley 508, to which the pin 512 is attached, to rotate, with the rotation of the pulley 508 being detected by the potentiometer 506 through a rope 521 stretched between the pulley 508 and a pulley 520, which is attached to the rotating shaft of the potentiometer 506. In this process, the shaft 501 and the flange 509 rotate simultaneously with the rotation of the pulley 508. A spring 522 serves to keep the tension of the rope 521 constant.

Feelers 523 and 524 are rotatably mounted on a measurement arm 527 by means of pins 525 and 526, the measurement arm 527 being attached to the flange 509.

Figure 22:
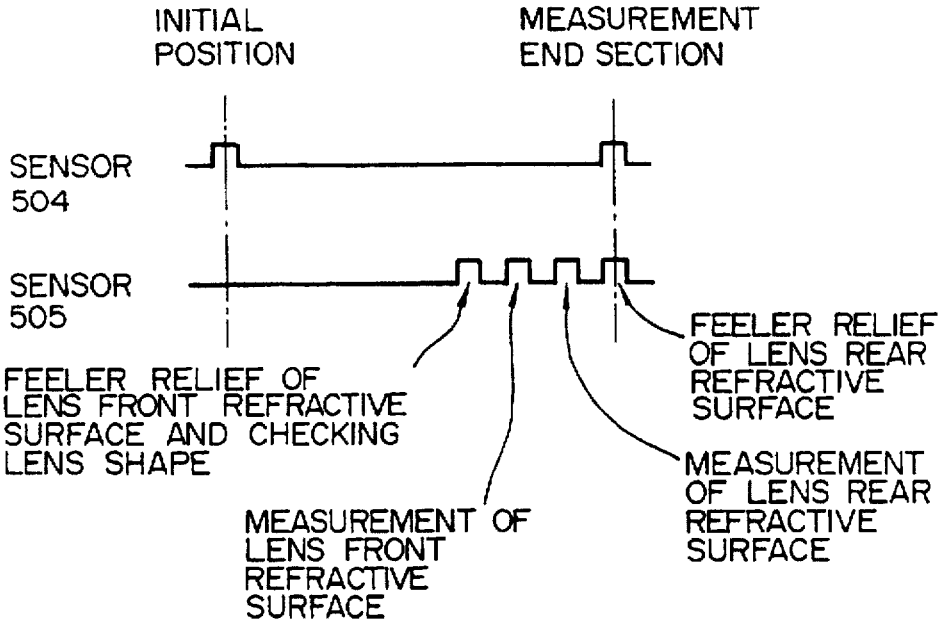
FIG. 22 is a chart illustrative of the relationship between the signals of photoswitches 504 and 505.

The photoswitch 504 detects the initial position and the measurement end position of the measurement arm 527. The photoswitch 505 detects the relief position and the measurement position of the feelers 523 and 524 with respect to the front refractive surface and the rear refractive surface of the lens. The measurement end position detected by the photoswitch 504 coincides with the relief position with respect to the rear refractive surface of the lens detected by the photoswitch 505. FIG. 22 is a chart showing the mutual relationship between the signals of the photoswitches 504 and 505.

As shown in FIG. 18, the measurement arm 527 is equipped with a shaft 529, to which a microswitch 528 is attached. Provided on the shaft 529 is a rotatable arm 531 having a rotatable feeler 530. This rotatable arm 531 is retained in the direction of the arrow by a spring 532, with the position of the feeler 530 being detected by the microswitch 528.

A cover 533 serves to prevent adhesion of grinding water, etc. to the measurement device, and a seal member 534 serves to prevent grinding water etc., from entering the measurement device through the gap between the device and the cover.

While in this embodiment a third feeler 530 is provided such as to abut against the lens edge, it is possible to omit this feeler 530 since the feelers 523 and 524 also indicate abnormal data when the lens is not fit for the processing.

(b) Measuring Method

Figure 23:
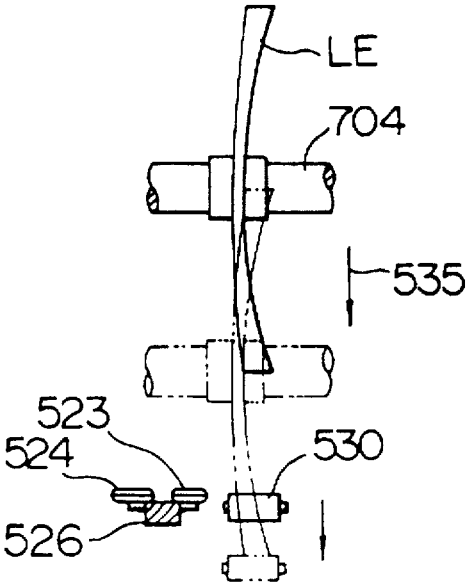
FIG. 23 is a diagram for explaining the measuring operation performed in the measuring section.

First, the motor 503, which is controlled by the photoswitch 505, is rotated so as to rotate the measurement arm 527 from the initial position to the relief position with respect to the front refractive surface of the lens, as shown in FIG. 23. In the relief position, the feeler 523 and the lens are positioned as not to interfere with each other when the carriage 700 holding the lens is displaced in the direction indicated by the arrow and, at the same time, the feeler 530 is positioned so as to abut against the lens edge.

Subsequently, the lens LE is displaced in the direction of the arrow 535. The displacement amount is controlled on the basis of the data on the configuration of the eyeglasses frame portion into which the processed lens is to be fitted or the eyeglass contour data. On the basis of such data, the lens moves in the direction indicated by the arrow.

If there is no deviation of the lens size from the eyeglasses frame portion configuration data or the eyeglass contour data, the feeler 530 abuts against the lens edge and moves in the direction of the arrow 535, with this action being detected by the microswitch 528. If the lens size deviates from the configuration data, a display is given on the display section 3, through a signal of the microswitch 528, to the effect that grinding can not be performed. When the microswitch 528 detects the movement of the feeler 530, the motor 503 is rotated in such a manner as to cause the feeler 523 to abut against the front refractive surface of the lens in order to measure the configuration of the front refractive surface of the lens. The rotation is effected to a position which is determined taking into account the general thickness of the lens and the length in the lens edge direction of the feeler 530.

When the feeler 523 moves to the position indicated by the two-dot chain line, the force of the spring 511 attached to the pulley 507 acts in such a manner as to cause the feeler 523 to abut against the front refractive surface.

One rotation of the lens around chuck shafts 704a and 704b causes the lens to move in the direction of the arrow 536 and the feeler 523 to move in the direction of the arrow 537 in accordance with the above configuration data on the eyeglasses frame portion or the eyeglass contour data, the movement amount being detected by the potentiometer 506 through the rotation amount of the pulley 508, whereby the configuration of the front refractive surface of the lens is obtained. At the same time, the microswitch 528 also performs measurement to determine whether or not it is possible to process the lens into the eyeglass contour in conformity with the above data, and the result of the measurement is displayed.

Afterwards, the carriage 700 is returned to the initial position and the motor 503 is further rotated to bring the lens to the relief position with respect to the rear refractive surface. The lens is then moved to the measurement position, the movement amount being measured by the feeler 524 in the same manner as in the measurement of the front refractive surface while causing the lens to make one rotation.

In this embodiment, either the front surface or the rear surface of the lens is measured with the feeler abutting against the lens surface along the locus of the tapered edge bottom surface (or the distal edge). However, the lens front surface is usually subjected to spherical processing so that data at four arbitrary points are enough even if factors such as axial deviation are taken into account. By simple calculation of these data and one-side data measured in substantially the same manner as this embodiment (although the number of measurement points is merely increased in the case of the astigmatic lens, it is more convenient in the case of the progressive lens to abut the feeler against the position corresponding to the lens edge), values at substantially the same level as the measured values obtained in this embodiment can be derived.

(D) Display Section and Input Section

Figure 24:
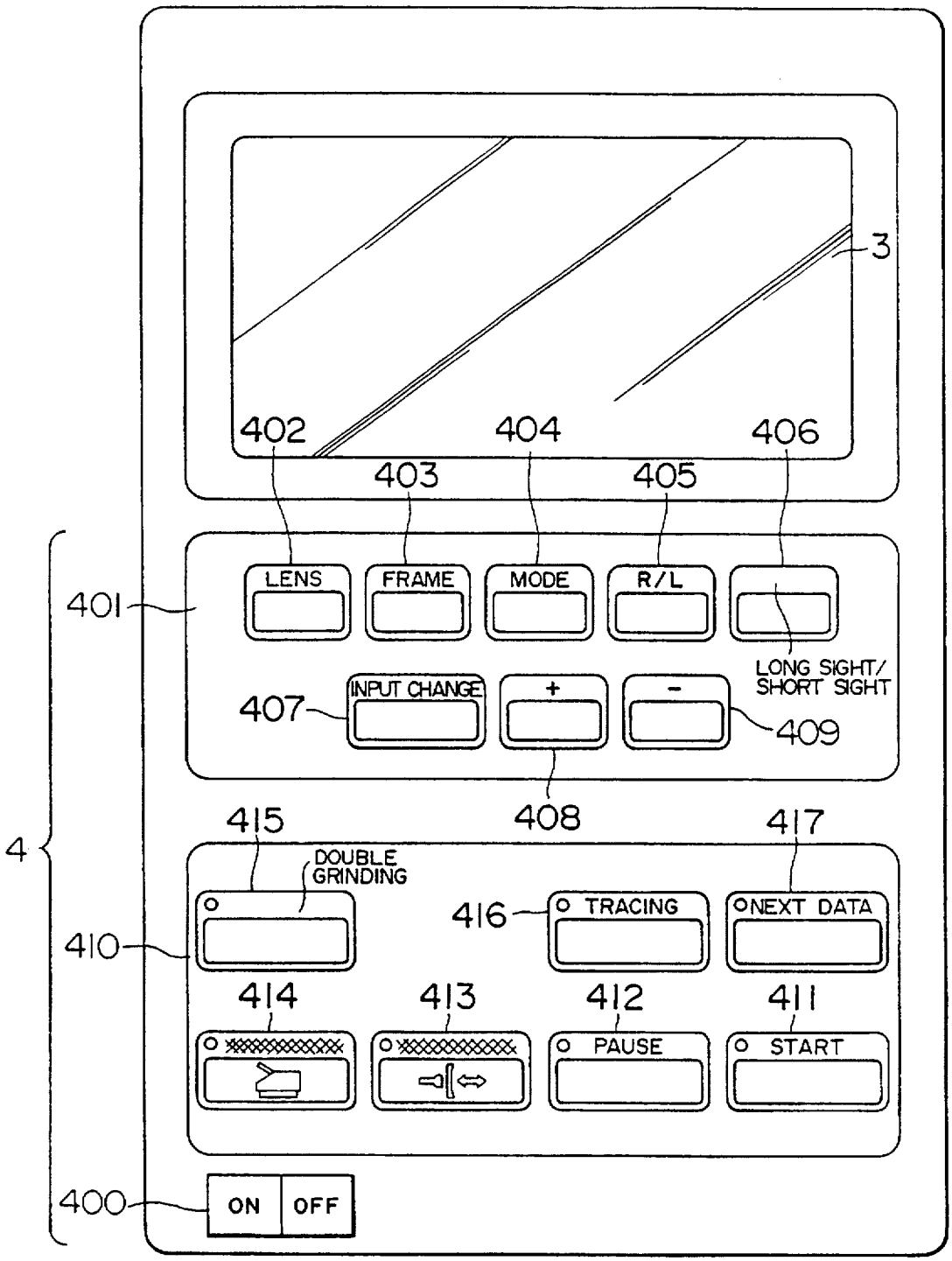
FIG. 24 is a diagram showing an outer appearance of a display section and an input section according to the embodiment of the invention.

FIG. 24 is a diagram showing the outer appearance of the display section 3 and the input section 4 of this embodiment, these two sections being integrally formed.

The input section of this embodiment comprises different kinds of seat switches such as a main switch 400 for turning on or off the power source, a setting switch group 401 for inputting various kinds of processing information, and an operation switch group 410 for indicating operation methods of the device.

The setting switch group 401 consists of a lens switch 402 for indicating whether a lens to be processed is made of a plastic material or a glass material, a frame switch 403 for indicating whether a frame is made of resin or metal, a mode switch 404 for selecting the plane processing mode or the tapered edge machining mode, an R/L switch 405 for selecting whether a left-eye lens or a right-eye lens is to be processed, a long sight/short sight switch 406 for changing the vertical layout of the lens optical center and the PD value to be suited for a lens for the longsighted or for the shortsighted, an input change switch 407 for selecting alteration items of the set data, a (+) switch 408 and a (−) switch 409 for increasing and decreasing data in the items selected by the input change switch 407.

The operation switch group 410 consists of a start switch 411, a pause switch 412 for stopping the device temporarily and also for serving as an image change switch for tapered edge simulation display, a switch 413 for opening/closing the lens chucks, a switch 414 for opening/closing the cover, a double grinding switch 415 for finishing the lens by double grinding, a tracing switch 416 for indicating the lens frame and template tracing, and a next-data switch 417 for transferring the data measured by the lens frame portion and template configuration measurement section 2.

The display section 3 is formed of a liquid crystal display which is controlled to show set values of processing information, the tapered edge simulation of the tapered edge position and the fitting condition of the tapered edge with the lens frame, the reference set values, and so forth, by means of the main arithmetic processing circuit which will be described later.

Figure 25:
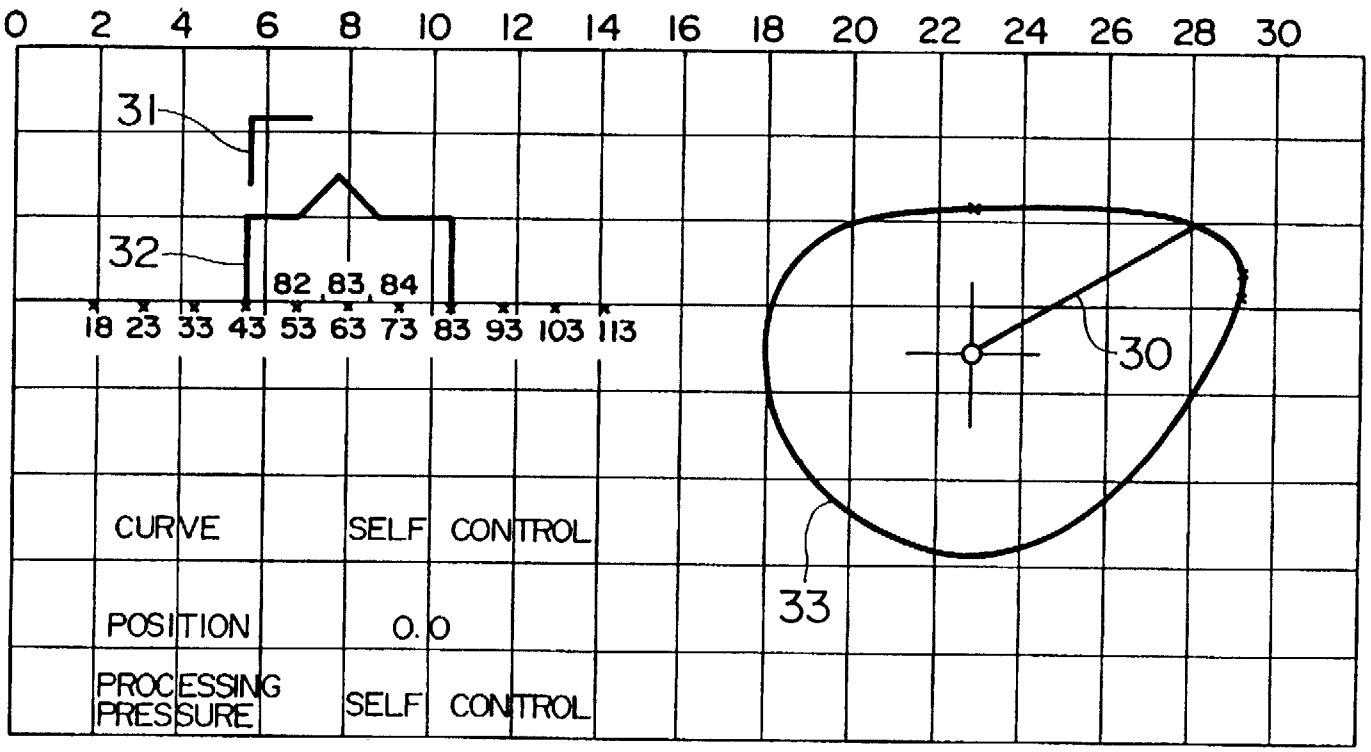
FIG. 25 is a diagram showing a display image of tapered edge simulation.

FIG. 25 is an example of a display image, showing the tapered edge simulation.

(3) Electric Control System for the Whole Grinding Apparatus

The electric control system of this embodiment which has the above-described mechanical construction will now be described.

Figure 26A:
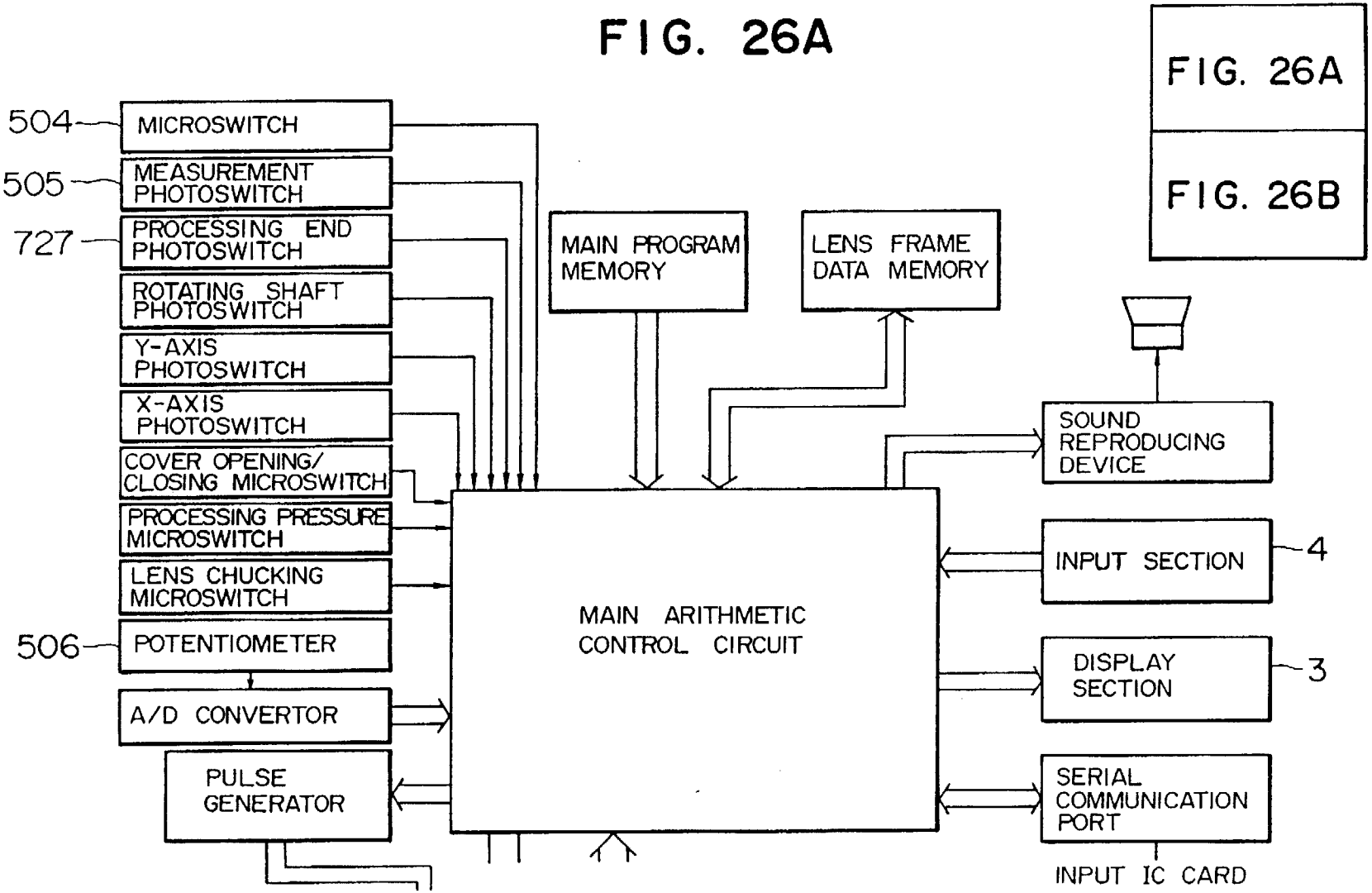
FIGS. 26A and 26B are a block diagram showing an electric system of the whole grinding machine.
Figure 26B:
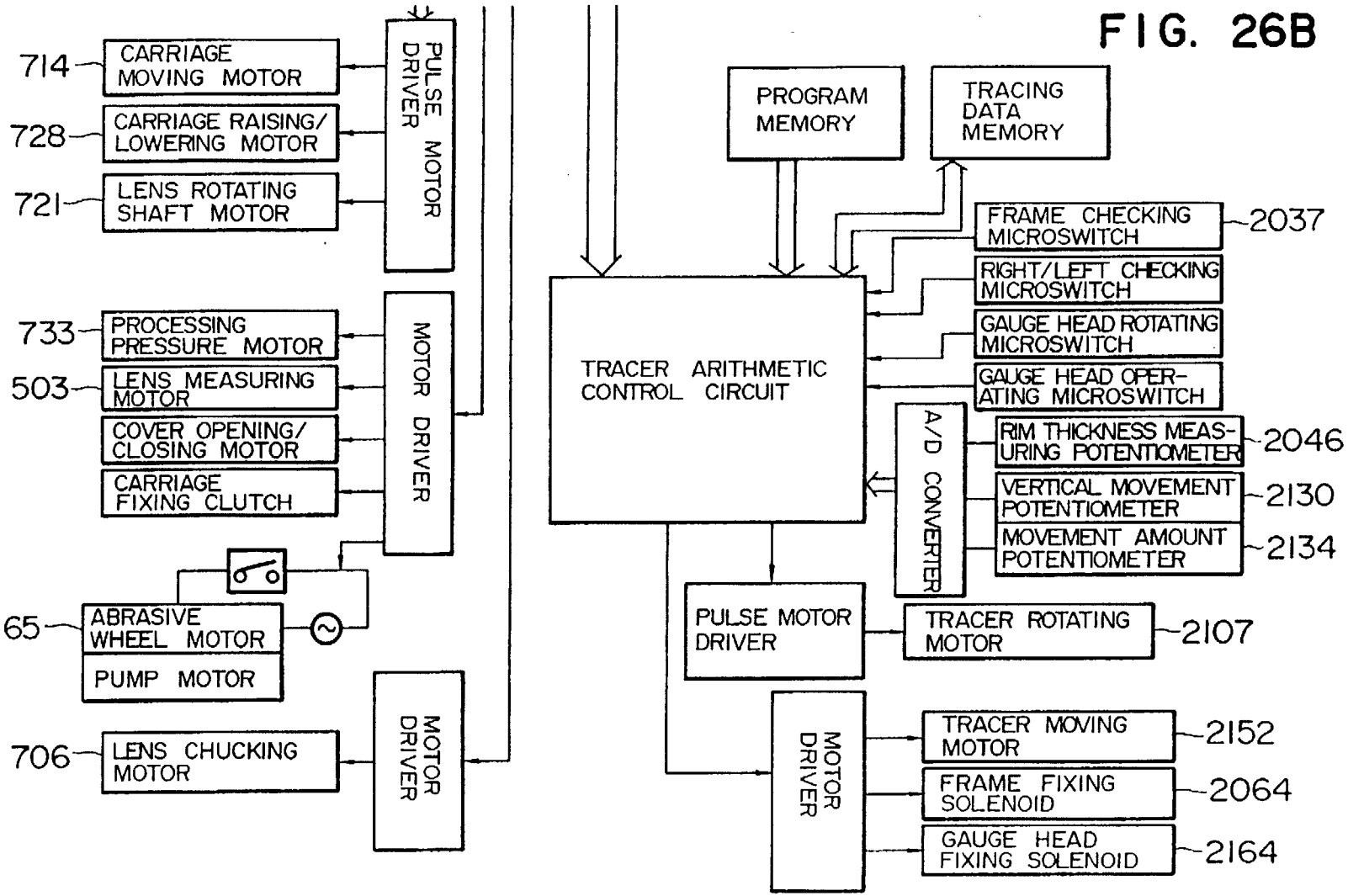

FIGS. 26A and 26B are a block diagram showing an electric system of the whole grinding apparatus.

A main arithmetic control circuit is formed of, for example, a microprocessor, and it is controlled by a sequence program stored in a main program. The main arithmetic control circuit can exchange data with IC cards, eye examination system devices and so forth through a serial communication port, and perform data exchange and communication with a tracer arithmetic control circuit of the lens frame portion and template configuration measurement section.

The display section 3, the input section 4 and a sound reproducing device are connected to the main arithmetic control circuit.

Photoswitch units including the photoswitches 504 and 505 for measurement, and processing end photoswitches for detecting the processing end condition, and microswitch units for the cover opening/closing, the processing pressure and the lens chucks, are connected to the main arithmetic control circuit.

A potentiometer 506 for measuring configurations of lenses to be processed is connected to an A/D converter whose conversion results will be inputted into the main arithmetic control circuit. Measurement data of the lenses which have been arithmetically processed in the main arithmetic control circuit are stored in a lens/frame data memory.

A carriage moving motor 714, a carriage raising/lowering motor 728 and a lens rotating shaft motor 721 are connected to the main arithmetic control circuit through a pulse motor driver and a pulse generator. The pulse generator determines the pulse number and the frequency (Hz) of the output to the respective pulse motors, i.e., controls the operation of the respective motors, in response to commands from the main arithmetic control circuit.

Each of a processing pressure motor 733, a lens measuring motor 503 and a cover opening/closing motor is driven by a drive circuit in response to commands from the main arithmetic control circuit.

A magnet motor 65 and a water supply pump motor are driven by an alternating current power source, and they are rotated/stopped by a switch circuit which is controlled in response to commands from the main arithmetic control circuit.

Next, the lens frame portion (and template) configuration measuring section will be described.

Output terminals of potentiometers 2130, 2134 for measuring the lens frame portion and template configurations and an output terminal of a potentiometer 2046 for measuring the rim thickness of the frame are connected to an A/D converter whose conversion results will be inputted into the tracer arithmetic control circuit. Microswitch units including microswitches for checking the frame and the like are also connected to the tracer arithmetic control circuit.

A tracer rotating motor 2107 is controlled by the tracer arithmetic control circuit through a pulse motor driver. Further, a tracer moving motor 2152, a frame fixing solenoid 2064 and a gauge head fixing solenoid 2164 are driven by the respective drive circuits which have received commands from the tracer arithmetic control circuit.

The tracer arithmetic control circuit is formed of, for example, a microprocessor, and it is controlled by a sequence program stored in a program memory.

The lens frame portion and template configuration data thus measured are temporarily stored in a tracing data memory, and then, transmitted to the main arithmetic control circuit.

(4) Operation of the Whole Grinding Apparatus

The operation of the lens grinding apparatus will now be described on the basis of a flow chart of FIGS. 27A and 27B.

Step 1-1

Figures 27A, 27B:
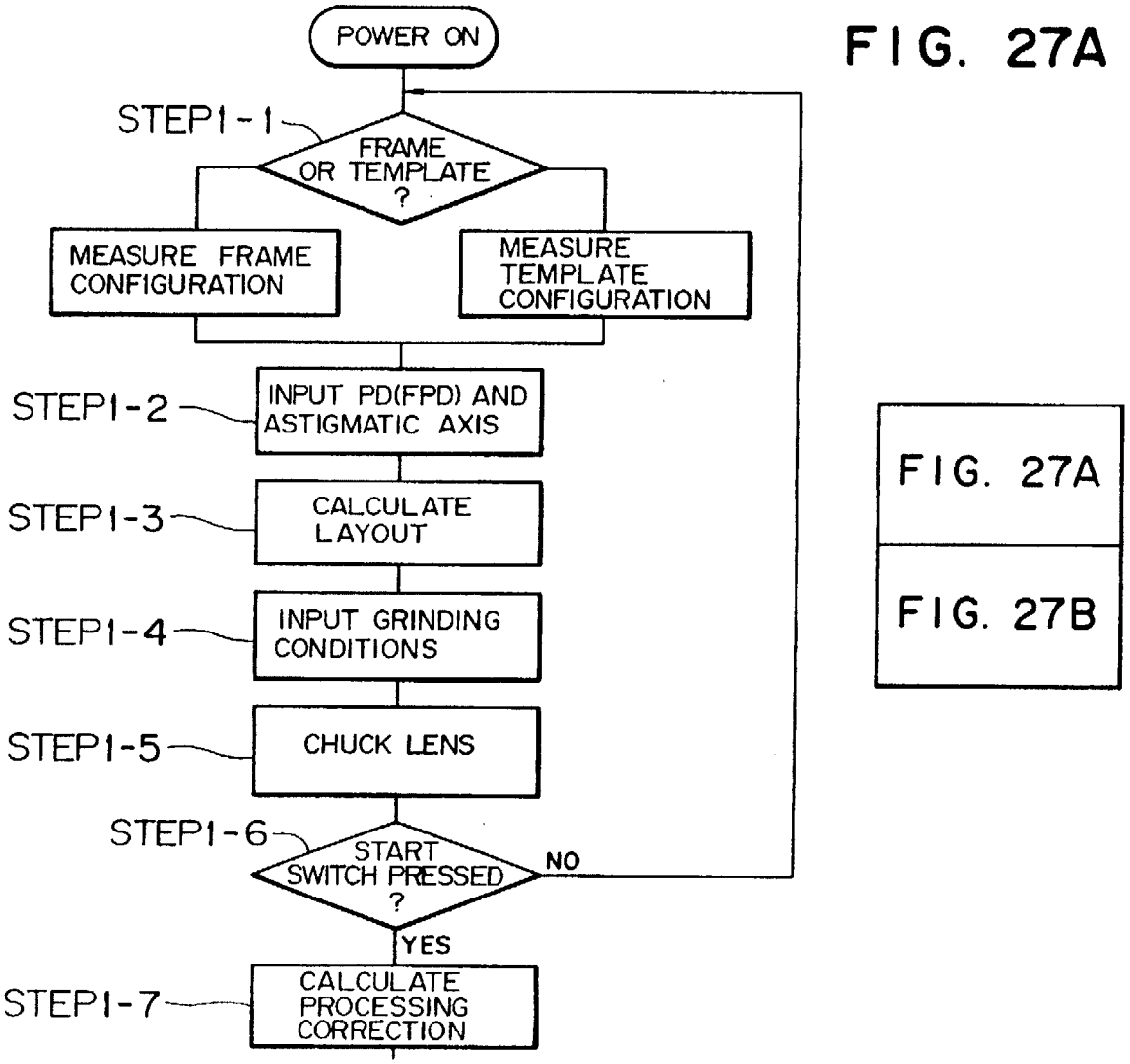
FIGS. 27A and 27B are a flow chart for explaining the operation of the grinding machine.
Figure 27B:
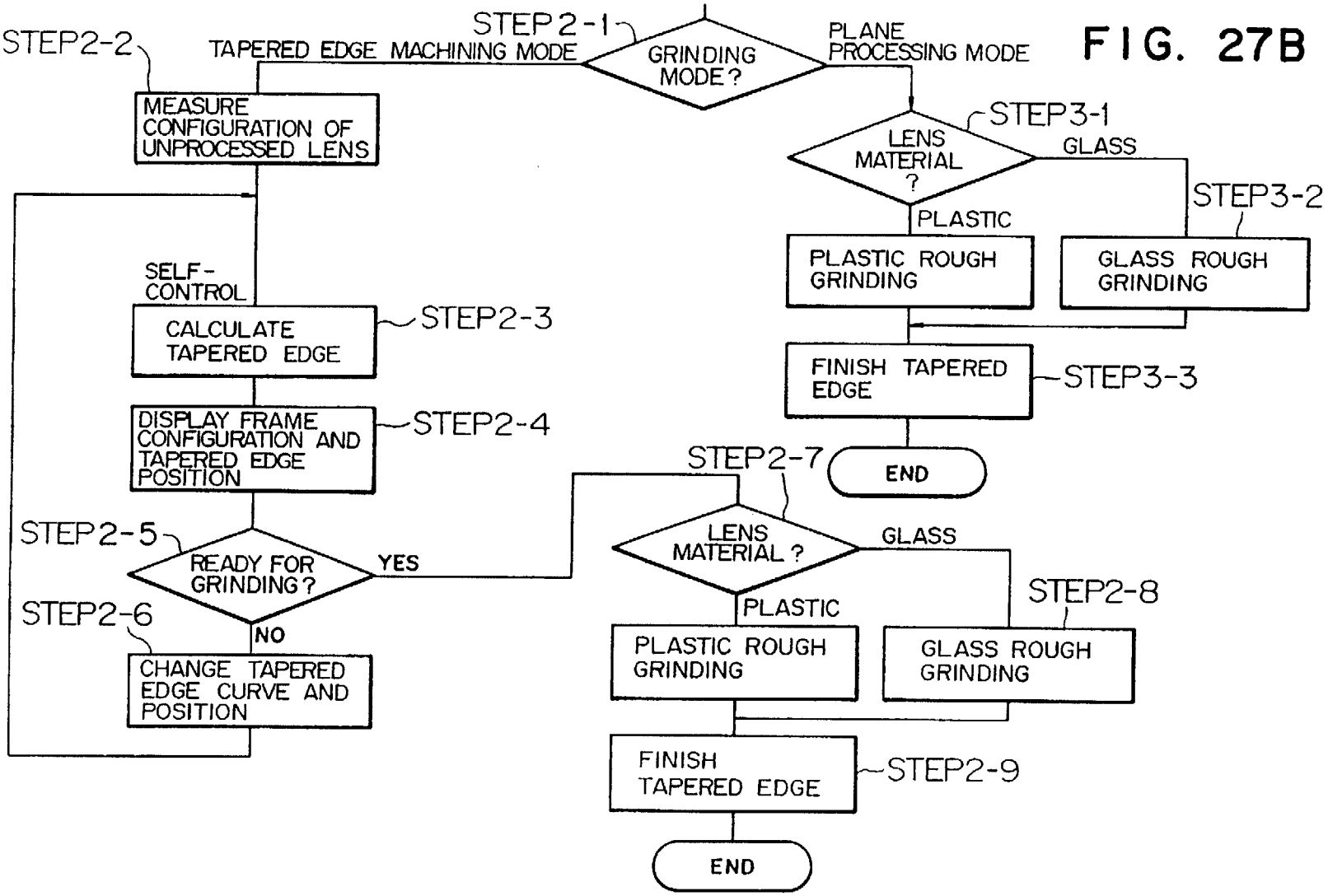

Referring to FIGS. 27A and 27B, after the main switch 400 is turned on, a frame or template is first set in a frame or template holding section, and then, tracing is conducted by the tracing switch 416.

Step 1-2

The PD value and astigmatic axes of the user are inputted. The FPD value is further inputted in the case of the template measurement. Also, the inputted PD value is judged to be for the long sight or the short sight, and the result is set by the long sight/short sight change switch 406. The setting is displayed in the display section 3. After the long-sight PD value is inputted with the long sight mode being selected, the setting is changed to the short sight mode by the long sight/short sight change switch 406. Then, the inputted value is transformed into the short-sight PD value by the following expression:

$$\text{Short-Sight PD}=\text{Long-Sight PD}\times((1-12)/(1+13))$$

wherein 1 expresses a required operation distance; 12 expresses a distance between corneal apexes of the Japanese; and 13 expresses a distance between a corneal apex and a turning point.

After the short-sight PD value is inputted with the short sight mode being selected, the setting is changed to the long sight mode. Then, the inputted value is transformed into the long-sight PD value by the following expression (see U.S. Pat. No. 4,944,585):

$$\text{Long-Sight PD}=\text{Short-Sight PD}\times((1+13)/(1-12))$$

Concerning the vertical layout, values inputted for the short sight and the long sight in the above-described reference value setting are set. When the operator intends to alter the set values, alteration an cbe conducted by use of the (+) switch 408 and the (−) switch 409. Then, the PD value can also be altered.

Step 1-3

From the frame or template radius vector information and the FPD value obtained in Step 1-1, and the PD vertical layout information inputted in Step 1-2, coordinate transformation is conducted about a new method so that new radius vector information ($r_s\,\delta_n$, $r_s$ coordinate center according to the above-described $\theta_n$) is obtained and stored in the frame data memory.

Step 1-4

The operator judges the material of the lens to be processed and inputs whether it is a glass lens or a plastic lens, by means of the lens change switch 402. The operator also inputs whether the frame is made of metal or resin, by means of the frame change switch 403, whether the processed lens for a right eye or for a left eye, by means of the R/L change switch 405, and whether plane processing or tapered edge machining is selected, by means of the mode switch 404. The lens processing size is determined on the basis of the set values inputted beforehand in the reference value setting for each of eight combinations of the lens materials, the frame materials and the processing modes.

When the operator intends to alter the set values, alteration can be conducted by use of the (+) switch 408 and the (−) switch 409. When the R/L designation of the processed lens is the same as the frame measurement, the data are employed as they are. When the R/L designation is different, however, the data of the opposite side are employed.

Step 1-5

The switch 413 for opening/closing the lens chucks is operated to rotate the motor 706, to thereby chuck the lens. When the lens has directions such as an astigmatic axis, the lens is chucked with the axial direction extending toward the abrasive wheel rotating center.

Step 1-6, 1-7

When no abnormal state is caused in the above steps, the operation is started by pushing the start switch 411.

After confirming that the start switch 411 has been pushed, the main arithmetic control circuit performs processing correction (abrasive wheel radius correction).

A point a denotes the abrasive wheel rotating center; a point b denotes the lens processing center; R denotes a radius of the abrasive wheel; LE denotes frame data; and L denotes the distance between the abrasive wheel rotating center and the lens processing center. The radius vector information ($r_s\,\delta_n$, $r_s\,\theta_n$) is read from the frame data memory, and the following calculation is conducted:

$$L = r_s\,\delta_n \cos\theta_n + \sqrt{R^2 - (r_s\,\delta_n \sin r_s\,\theta_n)^2}$$

$$(n = 1, 2, 3 \ldots N)$$

When an angle of the astigmatic axis is not 180 degrees, $r_s\,\theta_n$ is offset by an extent corresponding to the difference, and $r_s\,\theta'_n$ is used in place of $r_s\theta_n$.

Subsequently, the radius vector information ($r_s\,\delta_n$,$r_s\,\theta_n$) is rotated about the processing center for a slight angle, as desired, and the same calculation is conducted with the above expression.

The rotational angle of this coordinate is expressed as $\xi_i$ (i=1, 2, 3 . . . N), and it is rotated for 360 degrees successively from $\xi_i$ to $\xi_n$. The maximum value of L at each $\xi_i$ is expressed as $L_i$, and $r_s\theta_n$ at the time is expressed as $\theta_i$. Also, ($L_i$,$\xi_i$,$\theta_i$) (i=1, 2, 3 . . . N) is set as processing correction information and stored in the frame data memory.

Step 2-1

When the tapered edge machining mode is selected in Step 1-4, proceed to Step 2-2, and when the plane processing mode is selected, proceed to Step 3-1.

Step 2-2

When the tapered edge machining mode is selected, the main arithmetic control circuit rotates the lens rotating shaft motor 721 through the pulse generator and the pulse motor driver, to thereby rotate lens shafts 704a and 704b in such a manner that $r_s\theta_n$ is directed toward the abrasive wheel rotating center.

Next, in the same method, the motor 714 is rotated to move the carriage to the reference position for measurement at the left end of the carriage stroke. Then, the motor 728 is rotated to change L until the measurement is possible.

Thereafter, the lens edge position on the line of the radius vector information is measured by the unprocessed lens configuration measurement mechanism described above. The lens front-surface edge position thus obtained is denoted by $rZ_n$, and the lens rear-surface edge position is denoted by $lZ_n$. They are set as lens edge information ($lZ_n$, $rZ_n$) (n=1, 2, 3 . . . N) and stored in the frame data memory.

When the outer diameter of the lens is judged to be partially smaller than the diameter of the eyeglass contour, it is judged that a lens having a desired lens frame configuration can not be obtained, and an alarm signal is displayed in the display section. Also, performance of the subsequent steps is stopped.

Step 2-3

The front surface curve and the rear surface curve are obtained from the lens edge information ($lZ_n$, $rZ_n$) obtained in Step 2-2.

First, the radius vector information ($r_s$ $\delta_n$, $r_s$ $\theta_n$) is transformed into a rectangular coordinate. From the respective lens edge information ($lZ_1$, $rZ_1$), ($lZ_2$, $rZ_2$), $lZ_3$, $rZ_3$) and $lZ_4$, $rZ_4$) of four arbitrary points ($X_1$, $Y_1$), ($X_2$, $Y_2$), ($X_3$, $Y_3$) and ($X_4$, $Y_4$), the front surface curve and the center are obtained.

In the following expressions, (a, b, c) expresses a center coordinate of the curve; and R expresses a radius of the curve.

$$a = D_1/D$$

$$b = D_2/D$$

$$c = D_3/D$$

$$R = \sqrt{(X_1 - a)^2 + (X_1 - b)^2 + (lZ_a - c)^2}$$

wherein $$D = \begin{vmatrix} (X_1 - X_2) & (Y_1 - Y_2) & (lZ_1 - lZ_2) \\ (X_1 - X_3) & (Y_2 - Y_3) & (lZ_1 - lZ_3) \\ (X_1 - X_4) & (Y_2 - Y_4) & (lZ_1 - lZ_4) \end{vmatrix}$$

$$D_1 = \begin{vmatrix} K_1 & (Y_1 - Y_2) & (lZ_1 - lZ_2) \\ K_2 & (Y_2 - Y_3) & (lZ_1 - lZ_3) \\ K_3 & (Y_2 - Y_4) & (lZ_1 - lZ_4) \end{vmatrix}$$

$$K_1 = \frac{(X_1^2 - X_2^2) + (Y_1^2 - Y_2^2) + (lZ_1^2 - lZ_2^2)}{2}$$

$$K_2 = \frac{(X_1^2 - X_3^2) + (Y_1^2 - Y_3^2) + (lZ_1^2 - lZ_3^2)}{2}$$

$$K_3 = \frac{(X_1^2 - X_4^2) + (Y_1^2 - Y_4^2) + (lZ_1^2 - lZ_4^2)}{3}$$

$$D_1 = \begin{vmatrix} (X_1 - X_2) & K_1 & (lZ_1 - lZ_2) \\ (X_1 - X_3) & K_2 & (lZ_1 - lZ_3) \\ (X_1 - X_4) & K_3 & (lZ_1 - lZ_4) \end{vmatrix}$$

-continued $$D_1 = \begin{vmatrix} (X_1 - X_2) & (Y_1 - Y_2) & K_1 \\ (X_1 - X_3) & (Y_2 - Y_3) & K_2 \\ (X_1 - X_4) & (Y_2 - Y_4) & K_3 \end{vmatrix}$$

Next, lZ is all substituted by rZ, and the rear surface curve and the center are obtained. The tapered edge curve is obtained on the basis of such information.

The tapered edge curve is a curve depicted by the apex of a V-shaped groove on the outer periphery of the lens which is formed for lens fitting. Generally, a curve along the front surface curve is preferred. However, if the tapered edge curve is too sharp or too dull, it is inconvenient for fitting the lenses in the frame. Therefore, when the front surface curve value is in a certain range, the same curve as the front surface curve is used as the tapered edge curve. The position of the tapered edge apex is determined to be rearwardly displaced for a certain amount from the lens front-surface edge position. The center of the curve is established on the line connecting the center of the front surface curve and the center of the rear surface curve.

When the tapered edge curve value exceeds the predetermined range, $yZ_n$ is obtained, on the basis of the lens edge information ($lZ_n$, $rZ_n$), from the following expression:

$$lZ_n + (rZ_n - lZ_n)R/10 = yZ_n$$

In this case, when R=4, it means the same as establishing the lens edge thickness with a rate 4:6.

When the curve along the front surface curve can be obtained, its data are expressed as ($r_s\theta_n$, $y_1Z_n$). When it is impossible, the data obtained with R=4 are expressed as ($r_s\theta_n$, $y_4Z_n$) and regarded as the tapered edge data.

Step 2- 4

The tapered edge configuration obtained in Step 2-3 is displayed in the display section 3.

The frame configuration is shown in the display section 3 from the radius vector information ($r_s$ $\delta_n$, $r_s$ $\theta_n$), and also, a rotary cursor 30 having the center at the processing center is indicated. A tapered edge cross section 32 at the position where the cursor abuts against the frame configuration is shown in the left side of the panel. The cursor rotates to the right while the (+) switch is pressed, and it rotates to the left while the (−) switch is pressed. The tapered edge cross section at the position of the cursor is displayed constantly.

When the rotary cursor is at a position indicated by a rim thickness measuring position mark 31, a rim position mark 33 is shown on the upper left side of the tapered edge cross section.

The tapered edge position is the position where the lens front surface has a predetermined relation with the rim front surface on the basis of the measured rim thickness.

Step 2-5, 2-6

When there is no problem after checking the tapered edge curve, the start switch 400 is pressed again to start processing.

In accordance with the designation in Step 1-4, the carriage is moved by the motor 714 in such a manner that the lens to be processed will be located above the rough abrasive wheel 60c for the plastic lens when the lens is made of plastic and above the rough abrasive wheel 60a for the glass lens when the lens is made of glass.

After rotating the abrasive wheel, the lens is moved by the motor such that the distance L between the abrasive wheel rotational center and the lens processing center becomes $L_1$ in the processing correction information ($L_i$, $\xi_i$, $\theta_i$) read from the frame data memory. Then, when the processing end photoswitch 727 is turned on, the lens is rotated such that the angle becomes $\xi_2$, and simultaneously, it is moved such that the distance L becomes $L_2$.

The above-described operation is repeatedly performed on the basis of $(L_i, \xi_i)$ (i=1, 2, 3 . . . N). Thus, the lens is processed into the configuration corresponding to the radius vector information $(r_s\ \delta_n, r_s\ \theta_n)$.

Step 2-7, 2-8, 2-9

After the lens is detached from the abrasive wheel by the motor 728, the lens is moved to the position above the tapered edge abrasive wheel by the carriage moving motor 714.

Subsequently, the the locus of the tapered edge curve $(r_s\delta_n, r_s\ \theta_n, yZ_n)$ is obtained from the radius vector information $r_s\delta_n, r_s\theta_n)$ and the tapered are calculated. By adding them, the peripheral length of the the locus of the tapered edge curve is approximately obtained and expressed as $\pi_b$.

Then, the size correction amount $\Delta$ is obtained.

$$=(\pi_b-\pi_f)/2\ \pi$$

($\pi_f$:Peripheral length of eyeglass contour)

Further, the tapered edge machining information $(L'_i, \xi_i, Z_i)$ is obtained after the size correction and stored in the frame data memory. In this case, $$L'_i=L_i-\Delta$$

The tapered edge is processed while controlling $L'_i$ by the motor 728, $\xi_i$ by the motor 721, and $Z_i$ by the motor 714 simultaneously in the order of i=1, 2, 3 . . . N on the basis of this information.

Step 3-1

In the case where the grinding mode is the plane processing mode, in accordance with the designation in Step 1-4, the carriage is moved by the motor 714 in such a manner that the lens to be processed will be located above the rough abrasive wheel 60c for the plastic lens when the lens is made of plastic and above the rough abrasive wheel 60a for the glass lens when the lens is made of glass. After rotating the abrasive wheel, the lens is moved by the motor 728 such that the distance L between the abrasive wheel rotational center and the lens processing center becomes $L_1$ in the processing correction information $(L_i, \xi_i, \theta_i)$ read from the frame data memory. Then, when the processing end photoswitch 727 is turned on, the lens is rotated such that the angle becomes $\xi_2$, and simultaneously, it is moved such that the distance L becomes $L_2$. The above-described operation is repeatedly performed on the basis of $(L_i, \xi_i)$ (i=1, 2, 3 . . . N). Thus, the lens is processed into the configuration corresponding to the radius vector information $(r_s\ \delta_n, r_s\ \theta_n)$.

Step 3-2, 3-3

After the lens is detached from the abrasive wheel by the motor 728, the lens LE is moved to the position above a plane portion of the tapered edge abrasive wheel 60c by means of the carriage moving motor 714. Then, the outer periphery of the lens LE is finished in the same method as Step 2-8 and the following steps.

This is an explanation on the principle of the operation. Needless to say, therefore, various alterations can be applied in accordance with a degree of automatization.

Although one embodiment of the present invention has been described heretofore, it is obvious to those who are skilled in the art that the embodiment can be easily modified with the same technical concept as the invention, and that such modifications are included in the range of the invention.

According to the present invention, as described above, one of the important factors for effectiveness in fitting the lenses in the frame that the peripheral length of the locus of the tapered edge curve is equal to the peripheral length of the three-dimensional eyeglass contour is taken into consideration. The lenses can be fitted in the eyeglasses frame by correcting errors of the peripheral length owing to a difference between a curve R of the lens frame and the tapered edge curve which is often caused in general lens fitting operation, by adjusting the frame to the tapered edge curve when the eyeglasses frame is made of a flexible material, and by modifying the curve R of the frame prior to the lens fitting operation when the frame material is not flexible.

What is claimed is:

1. A lens periphery processing apparatus for processing peripheries of lenses so as to fit the lenses in an eyeglasses frame, comprising:

input means for inputting the configuration of lens frame portions of said eyeglasses frame which is a result of three-dimensional measurement;

calculation means for deriving peripheral lengths of the lens frame portions from the three-dimensional lens frame portion configuration inputted by said input means;

tapered edge curve determining means for determining a curve [value] defined by the locus of the tapered edge of each lens; and computing means for computing the locus of the tapered edge of each lens which substantially coincides with the peripheral length of the associated lens frame portion which is obtained by said calculation means.

2. A lens periphery processing apparatus according to claim 1, which is connected, through an interface, to an eyeglasses frame configuration measurement device for three-dimensional measurement of the lens frame portions of the eyeglasses frame.

3. A lens periphery processing apparatus according to claim 1, wherein said tapered edge curve determining means remove warp elements of the frame from the three-dimensional lens frame portion information and process it into two-dimensional lens frame portion information in the radius vector direction, and said tapered edge curve determining means determine the tapered edge curve [value] on the basis of lens edge information of each lens to be processed at a position corresponding to said two-dimensional lens frame portion information thus processed.

4. A lens periphery processing apparatus according to claim 3, wherein said computing means comprise means for deriving a difference between the peripheral length of the locus of the determined tapered edge curve and the peripheral length in said three-dimensional lens frame portion information, and obtaining a correction amount of the position of the tapered edge for correcting said peripheral length difference.

5. A method for obtaining processing data of a lens periphery processing apparatus for fitting lenses in an eyeglasses frame, comprising:

a first step of three-dimensional measurement of the configuration of lens frame portions of said eyeglasses frame;

a second step of deriving peripheral lengths of the lens frame portions of said eyeglasses frame on the basis of the data obtained in said first step;

a third step of measuring the lens edge thickness and the lens curve of each lens to be fitted in the frame;

a fourth step of determining the curve [value] defined by the locus of the tapered edge on the basis of the data measured in said third step; and a fifth step of calculating control data of the lens periphery processing apparatus such that the peripheral length of the locus of the tapered edge determined in said fourth step substantially coincides with the peripheral length of the associated lens frame portion of said eyeglasses frame.

6. A lens periphery processing method for processing peripheries of lenses so as to fit the lenses in an eyeglasses frame, comprising:

a first step of three-dimensional measurement of the configuration of lens frame portions of said eyeglasses frame;

a second step of deriving peripheral lengths of the lens frame portions of said eyeglasses frame on the basis of the data obtained in said first step;

a third step of measuring the lens edge thickness and the lens curve of each lens to be fitted in the frame;

a fourth step of determining the curve [value] defined by the locus of the tapered edge on the basis of the data measured in said third step;

a fifth step of calculating control data of a lens periphery processing apparatus such that the peripheral length of the locus of the tapered edge determined in said fourth step substantially coincides with the peripheral length of the associated lens frame portion of said eyeglasses frame; and a sixth step of controlling the lens periphery processing apparatus on the basis of the control data obtained in said fifth step.

* * * * *